United States Patent
Kirk et al.

(10) Patent No.: US 12,524,714 B2
(45) Date of Patent: Jan. 13, 2026

(54) SYSTEMS AND METHODS FOR TIME ESTIMATION FOR MACHINE OPERATIONS

(71) Applicant: Deere & Company, Moline, IL (US)

(72) Inventors: Ryan Kirk, Urbandale, IA (US); Palash Gupta, Urbandale, IA (US); Mayur Deo, Warsaw, IN (US)

(73) Assignee: Deere & Company, Moline, IL (US)

( * ) Notice: Subject to any disclaimer, the term of this patent is extended or adjusted under 35 U.S.C. 154(b) by 233 days.

(21) Appl. No.: 18/364,989

(22) Filed: Aug. 3, 2023

(65) Prior Publication Data
US 2025/0045652 A1    Feb. 6, 2025

(51) Int. Cl.
*G06Q 10/0631* (2023.01)
*G06Q 50/02* (2012.01)

(52) U.S. Cl.
CPC ......... *G06Q 10/0631* (2013.01); *G06Q 50/02* (2013.01)

(58) Field of Classification Search
CPC .... G06Q 10/0631; G06Q 50/02; A01D 75/30; A01D 41/127; A01B 76/00; A01M 7/0089
See application file for complete search history.

(56) References Cited

U.S. PATENT DOCUMENTS

| | | |
|---|---|---|
| 11,178,818 B2 | 11/2021 | Brammeier et al. |
| 11,240,961 B2 | 2/2022 | Anderson et al. |
| 2007/0239337 A1 | 10/2007 | Anderson |
| 2014/0257911 A1 | 9/2014 | Anderson |
| 2019/0050948 A1* | 2/2019 | Perry ................... G06Q 30/02 |
| 2021/0088354 A1* | 3/2021 | Anderson ............ A01B 69/008 |
| 2021/0205819 A1* | 7/2021 | Jia ........................... F26B 3/084 |
| 2022/0110252 A1* | 4/2022 | Vandike .............. G05D 1/0278 |
| 2022/0391721 A1* | 12/2022 | Apte .................... A01B 79/005 |
| 2023/0102560 A1* | 3/2023 | Morel .................. H05B 47/105 702/2 |
| 2023/0342392 A1* | 10/2023 | McCarson ........... G06F 16/587 |

(Continued)

OTHER PUBLICATIONS

"Estimating the field Capacity of Farm Machines" AG Decision Maker, File A3-24, Iowa State University, Revised May 2016. 5 pages.

(Continued)

*Primary Examiner* — Ashley L Redhead, Jr.
(74) *Attorney, Agent, or Firm* — Kelly, Holt & Christenson; Joseph R. Kelly

(57) ABSTRACT

A method comprises identifying an area of worksite at which an operation is to be performed, identifying a historical rate of work metric, obtaining a model, identifying a number of work machines that are to perform the operation, identifying a crop type corresponding to the operation to be performed, identifying an ETC metric based on the area of the worksite, the historical rate of work metric, the number of work machines, the crop type, and the model. The method further comprises identifying, once the operation is initiated, a first weight metric, a second weight metric, a live estimate metric indicative of a first time until the work will be completed in the operation, and identifying an ETR metric, indicative of a second time until the work will be completed in the operation, based on the first weight metric, the ETC metric, the second weight metric, and the live estimate metric.

16 Claims, 15 Drawing Sheets

(56) References Cited

U.S. PATENT DOCUMENTS

2024/0049633 A1* 2/2024 Vandike ............... A01D 41/127
2024/0169452 A1* 5/2024 Stevenson .............. G06Q 10/04

OTHER PUBLICATIONS

"Days Suitable for Fieldwork in Iowa", AG Decision Maker, File A3-25, Iowa State University, Revised Feb. 2020, 4 pages.
"Fuel Required for Field Operations", AG Decision Maker, File A3-27, Iowa State University, Oct. 2005, 2 pages.
"Farm Machinery Selection", AG Decision Maker, File A3-28, Iowa State University, Revised Jan. 2017, 9 pages.
Hancock et al. "Calculating Farm Machinery Field Capacities", University of Kentucky, May 1991, 6 pages.

* cited by examiner

SYSTEMS AND METHODS FOR TIME ESTIMATION FOR MACHINE OPERATIONS

FIELD OF THE DESCRIPTION

The present description relates to worksite operations. More specifically, the present description relates to controlling worksite operations.

BACKGROUND

There are a wide variety of different types of worksite operations. Some such worksite operations include agricultural worksite operations. Worksite operation architectures can include a plurality of mobile work machines, such as mobile agricultural machines, that operate at one or more worksites, such as one or more fields, to perform one or more worksite operations, such as one or more agricultural operations. The plurality of mobile work machines can be controlled to coordinate the performance of the one or more worksite operation in an effort to efficiently distribute the work machines to complete the one or more worksite operations efficiently.

The discussion above is merely provided for general background information and is not intended to be used as an aid in determining the scope of the claimed subject matter.

SUMMARY

A method comprises identifying an area of worksite at which an operation is to be performed, identifying a historical rate of work metric, obtaining a model, identifying a number of work machines that are to perform the operation, identifying a crop type corresponding to the operation to be performed, identifying an ETC metric based on the area of the worksite, the historical rate of work metric, the number of work machines, the crop type, and the model. The method further comprises identifying, once the operation is initiated, a first weight metric, a second weight metric, a live estimate metric indicative of a first time until the work will be completed in the operation, and identifying an ETR metric, indicative of a second time until the work will be completed in the operation, based on the first weight metric, the ETC metric, the second weight metric, and the live estimate metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
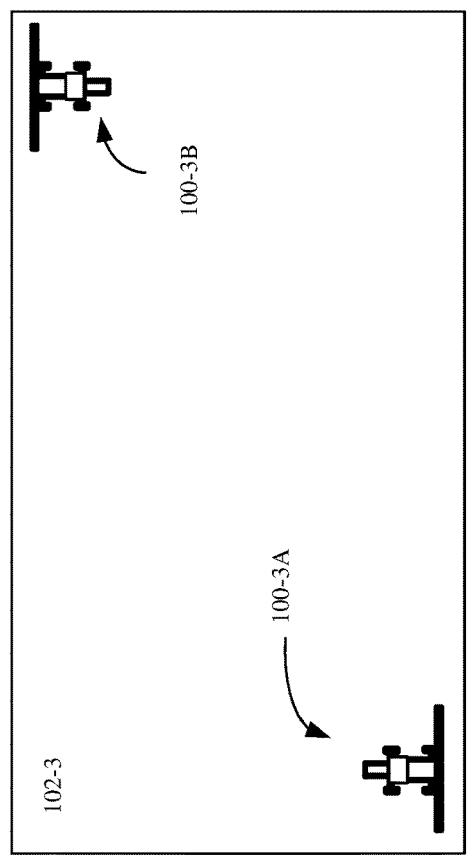
FIGS. 1A-C are pictorial illustrations showing example worksites.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

A worksite operation system architecture can include a variety of different mobile work machines that operate at one or more worksites to perform one or more worksite operations. For example, an agricultural worksite operation system architecture can include a variety of different mobile agricultural work machines that operate at one or more fields to perform an agricultural worksite operation.

It can be difficult for the manager(s) of a worksite operation system architecture to effectively plan and schedule the plurality of operations, distribute the plurality of different mobile work machines across the plurality of worksites to efficiently complete the plurality of operations, and control machine settings to efficiently complete the plurality of operations. For example, an agricultural worksite operation system architecture may include a plurality of mobile agricultural machines that are to perform at a plurality of fields. For instance, the agricultural worksite operation system architecture may include a plurality of mobile agricultural harvesting machines that are to perform harvesting at one or more fields during the harvesting season. Harvesting crop in a timely manner is important from a cost and profit perspective. For example, crop may be at the most profitable moisture level for only a short period of time. Thus, there is only a given window of time in which the crop can be harvested to maintain maximum profitability. This window of time can be further reduced by environmental factors such as weather, machine breakdown, operator-related issues, as well as various other factors. Thus, it is critical for the manager(s) to plan and schedule their harvesting operations and distribute their harvesting machines to perform the harvesting operations in an efficient manner. In another example, an agricultural worksite operation system architecture may include a plurality of mobile agricultural planting machines that are to perform planting at one or more fields during a planting season. Planting crop in a timely manner is important from a cost and profit perspective. For example, each crop (and crop hybrid) may have a maturation period (e.g., 100 days). Thus, for the crop to reach full maturity and therefore full yield, the crop must be planted at a time in which the crop will be given the required amount of growing days, otherwise yield, and therefore profit, can be reduced. Thus, there is only a given window of time in which the crop can be planted to maintain maximum profitability. The window of time can be further reduced by environmental factors such as weather, machine breakdown, operator-related issues, as well as various other factors. Thus, it is critical for the manager(s) to plan and schedule their planting operations and distribute their planting machines to perform the planting operations in an efficient manner. In another example, an agricultural worksite operation system architecture may include a plurality of mobile agricultural spraying machines that are to perform spraying at one or more field during a spraying season. Spraying crop in a timely manner is important from a cost and profit perspective. For example, applying product (e.g., fertilizer, herbicide, pesticide, etc.) at the correct time may increase yield, and therefore profit, and applying product at the incorrect time may lead to yield loss (and product waste), and therefore additional cost. For instance, it may be important to spray corn plants during (or shortly before) fertilization with pesticide to destroy pests that would otherwise feed on the corn silks. Thus, there is only a given window of time in which the crop can sprayed to maintain maximum profitability. This window of time can be further reduced by environmental factors such as weather, machine breakdown, operator-related issues, as well as various other factors. These are just some examples. Thus, it can be seen that it is critical for the manager(s) to plan and schedule their spraying operations and distribute their spraying machines to perform the spraying operations in an efficient manner.

In order to properly plan and schedule operations, distribute machines, and control machine settings, manager(s) need the ability to accurately estimate how long each operation at each worksite is going to take to complete prior to conducting the operations. This allows the manager(s) to set the plans and schedules of operations, the distribution of the machines, and the settings of the machines to complete operations at the worksites in an efficient manner. Additionally, factors at the worksite may have an effect on the time it takes to complete a worksite operation, and thus, manager(s) need the ability to accurately estimate how much time is remaining in a worksite operation that is underway. This allows the manager(s) to adjust the plan, schedule, distribution, as well the settings of the machines, as the operations are underway to complete operations at the worksites in an efficient manner.

The present disclosure proceeds with example systems and methods operable to generate an estimated time to complete (ETC), indicative of a time it will take for an operation to be performed to be completed, and an estimated time remaining (ETR), indicative of a time it will take for an operation that is underway to be completed. The ETC and the ETR account for historical performance indicative of ETCs of previous operations (at a machine level, an organization level, or a operation type level). Further, the ETC and the ETR account for variation that may occur due to differences in crop type as well as variability that may occur due to the number of machines performing the operation. Further the ETC and ETR differentiate between active work and non-active work time. Further, the ETR provides accounts for both historical performance indicative of ETCs of previous operations as well as data indicative of the live rate at which work is being performed during the operation.

It will be understood that while examples described herein proceed with reference to agricultural operations performed by mobile agricultural work machines at agricultural worksites (e.g., fields), the systems and methods described herein are applicable to various other operations, worksites, and mobile work machines, such as construction operations, construction worksites, and mobile construction work machines, turf management operations, turf management worksites, and turf management work machines, forestry operations, forestry worksite, and forestry work machines.

Figure 1B:
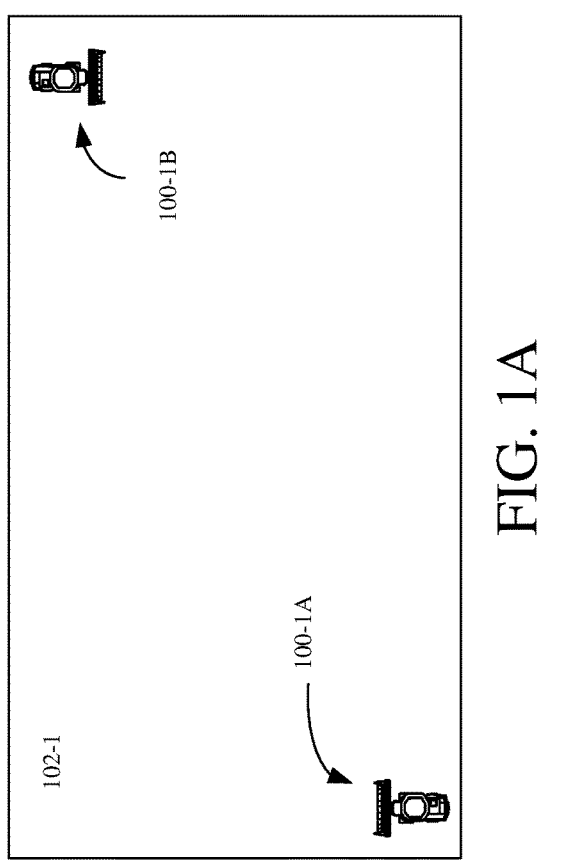
Figure 1C:
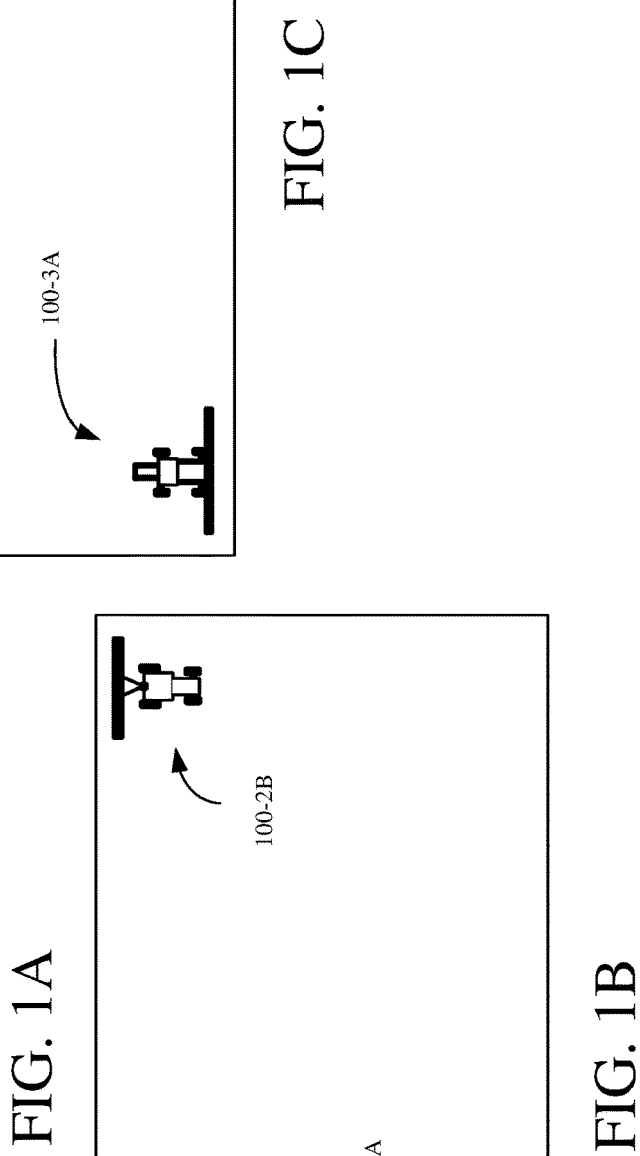

FIGS. 1A-C are pictorial illustrations showing example worksite operations. FIG. 1A illustrates an example agricultural worksite operation, in the form of a harvesting operation, in which a plurality of mobile agricultural work machines 100 (also called mobile work machine(s) 100, mobile machine(s) 100, and machine(s) 100 herein), in the form of mobile agricultural harvesting machines 100-1A and 100-1B, harvest at an example field 102-1. FIG. 1B illustrates an example agricultural worksite operation, in the form of a planting operation, in which a plurality of mobile agricultural work machines 100, in the form of mobile agricultural planting machines 100-2A and 100-2B, plant at an example field 102-2. FIG. 1C illustrates an example agricultural worksite operation, in the form of a spraying operation, in which a plurality of mobile agricultural work machines 100, in the form of mobile agricultural spraying machines 100-3A and 100-3B, spray at an example field 102-3.

Figure 2A:
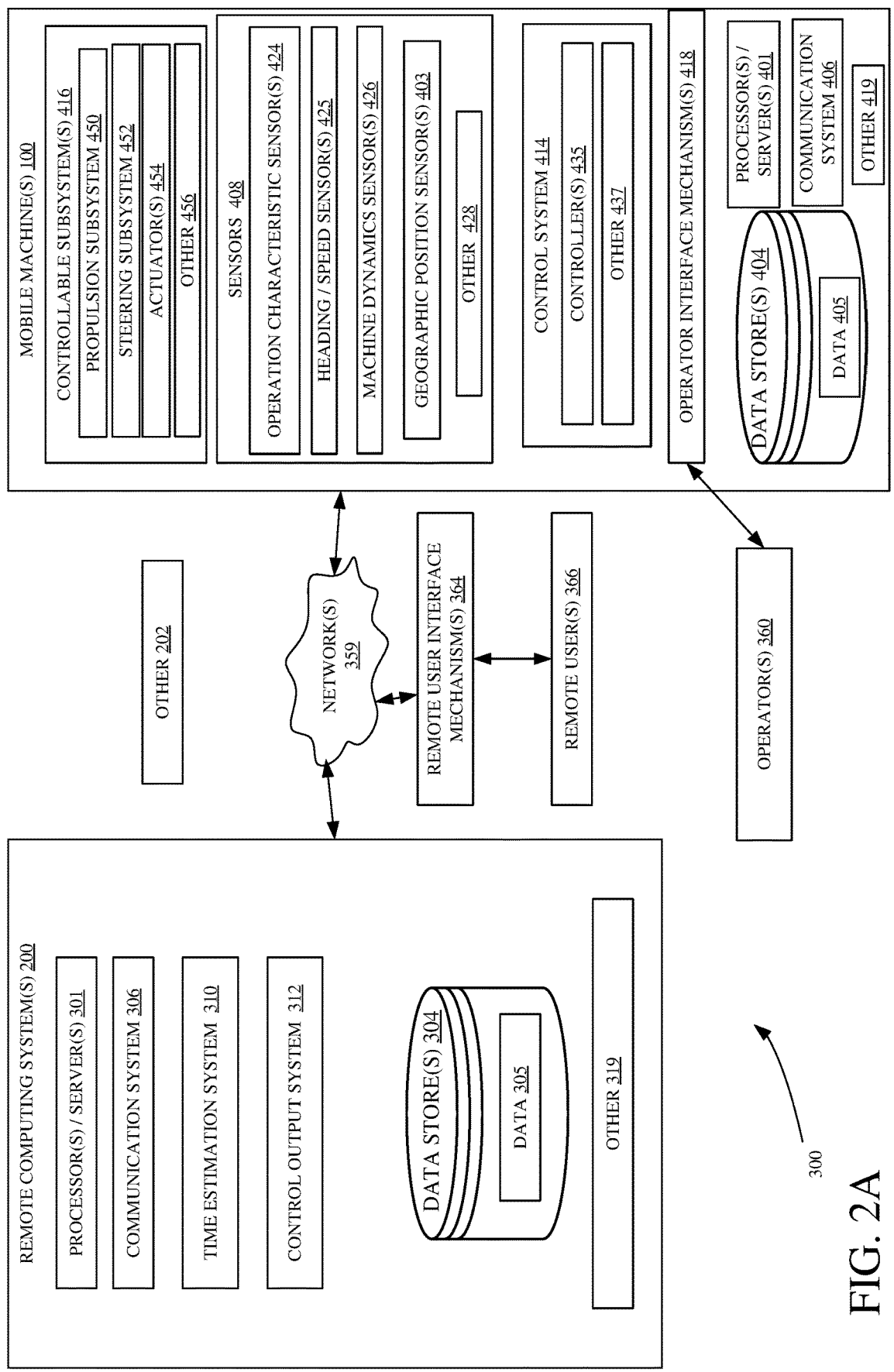
FIG. 2A is a block diagram of one example worksite operation system architecture.

FIG. 2A is a block diagram showing one example worksite operation system architecture 300 (also called worksite operation system 300). Worksite operation system 300 includes one or more mobile machines 100, one or more remote computing systems 200, one or more networks 359, one or more remote user interface mechanisms 364, and can include a variety of other items 202 as well. As illustrated in FIG. 1, mobile machines 100 can include a variety of different types of mobile work machines, such as harvesters 100-1, planter 100-2, sprayer 100-3, as well as a variety of other types of mobile work machines. Each mobile machine 100, itself, illustratively includes one or more processors or servers 401, one or more data stores 404, communication system 406, one or more sensors 408, control system 414, one or more controllable subsystems 416, one or more operator interface mechanisms 418, and can include various other items and functionality 419 as well. Remote computing systems 200, as illustrated, include one or more processors or servers 301, one or more data stores 304, communication system 306, time estimation system 310, control output system 312, and can include various other items and functionality 319.

Data stores 304 or data stores 404, or both, store a variety of data (generally indicated as data 305 and data 405 respectively), some of which will be described in more detail herein. For example, data 305 or data 405, or both, can include, among other things, worksite data, sensor data, machine data, historical data, models, including machine learned models, as well as various other data. Additionally, data 305 can include computer executable instructions that are executable by one or more processors or servers 301 to implement other items or functionalities of worksite operation system 300. Additionally, data 405 can include computer executable instructions that are executable by one or more processors or servers 301 to implement other items or functionalities of worksite operation system 300. It will be understood that data stores 304 or data stores 404, or both, can include different forms of data stores, for instance both volatile data stores (e.g., Random Access Memory (RAM)) and non-volatile data stores (e.g., Read Only Memory (ROM), hard drives, solid state drives, etc.).

Sensors 408 can include operation characteristic sensors 424, heading/speed sensors 425, machine dynamics sensors 426, geographic position sensors 403, and can include various other sensors 428 as well. The sensor data generated by sensors 408 can be communicated to remote computing systems 200 and to other items of mobile machines 100. Control system 414, itself, can include one or more controllers 435 for controlling various other items of mobile work machine 100, and can include other items 437 as well. Controllable subsystems 416 can include propulsion subsystem 450, steering subsystem 452, actuators 454, and can include various other subsystems 456 as well.

Operation characteristic sensors 408 include sensors that detect operation and operation characteristics of actuators 454. For example, sensors 408 may detect whether an actuator 454 is operating and at what parameter (or setting). Sensors 408 can include a variety of different types of sensors, such as pressure sensors, current and voltage sensors, rotary encoders, potentiometers, hall-effect sensors, transducers, accelerometers, imaging systems, such as cameras, ranging (time of flight sensors), as well as various other types of sensors. Operation characteristic sensors 408 are operable to detect and generate sensor data indicative of whether actuators 454 are operating. Additionally, operation characteristic sensors 408 are operable to detect and generate sensor data indicative of the settings at which the actuators 454 are operating at, such settings can include position or orientation, or both, speed of movement, direction of movement, pressure, as well as various other operating settings. The type of actuators 454 can vary with the type of mobile work machine 100, and thus, the sensors 408 may also vary with the type of mobile work machine 100.

Heading/speed sensors 425 detect a heading characteristic (e.g., travel direction) or speed characteristic (e.g., travel speed, acceleration, deceleration, etc.), or both, of a mobile work machine 100. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 403. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources.

Machine dynamics sensors 426 detect machine dynamics characteristics (e.g., pitch, roll, and yaw) of a mobile machine. Machine dynamics sensors 426 can include inertial measurement units, accelerometers, gyroscopes, magnetometers, inclinometers, as well as various other sensors.

Geographic position sensors 403 illustratively sense or detect the geographic position or location of a mobile work machine 100. Geographic position sensors 403 can include, but are not limited to, a global navigation satellite system (GNSS) receiver that receives signals from a GNSS satellite transmitter. Geographic position sensors 403 can also include a real-time kinematic (RTK) component that is configured to enhance the precision of position data derived from the GNSS signal. Geographic position sensors 403 can include a dead reckoning system, a cellular triangulation system, or any of a variety of other geographic position sensors.

Sensors 408 can also include various other types of sensors 428.

Control system 414 can include a variety of controllers 435, such as a communication system controller to control communication system 406, an interface controller to control one or more interface mechanisms (e.g., 318 or 364, or both), a propulsion controller to control propulsion subsystem 450 to control a travel speed of a mobile work machine 100, a path planning controller to control steering subsystem 452 to control a route or heading of a mobile work machine 100, and one or more actuator controllers to control operation of actuators 454.

Propulsion subsystem 450 includes one or more actuators (e.g., internal combustion engine, motors, etc.) that drive the ground engaging traction elements (e.g., wheels or tracks) of a mobile machine 100.

Steering subsystem 452 includes one or more actuators (e.g., electric actuators, hydraulic actuators, etc.) that are controllably actuatable to control the steering and thus heading of a mobile machine 100.

Actuators 454 include a variety of different types of actuators that control operation of one or more components of a mobile machine 100. Actuators 454 may include actuators that control the position or orientation of components of a mobile machine 100 as well as actuators that control a speed of components of a mobile machine 100. As previously mentioned, actuators 454 may vary as the type of mobile machine 100 varies. For instance, where the mobile machine 100 is a harvester 100-1, actuators 454 may include actuators that control the operating settings (e.g., position, orientation, speed, etc.) of components of the harvester that are used to engage and/or processes crop. Where the mobile machine 100 is a planter 100-2, actuators 454 may include actuators that control the operating settings (e.g., position, orientation, speed, etc.) of components that are used to apply material to the field, as well as open and close furrows in the field. Where the mobile machine 100 is a sprayer 100-3, actuators 454 may include actuators that control the operating settings (e.g., position, orientation, speed, etc.) of components that are used to apply material to the field. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

Communication system 406 is used to communicate between components of a mobile machine 100 or with other items of worksite operation system 300, such as remote computing systems 200 or other mobile machines 100, or both. Communication system 406 can include one or more of wired communication circuitry and wireless communication circuitry, as well as wired and wireless communication components. In some examples, communication system 406 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 406 can also include a system that facilitates downloads or transfers of information to and from a secure digital (SD) card or a universal serial bus (USB) card, or both. Communication system can utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

Communication system 306 is used to communicate between components of the remote computing system 200 or with other items of worksite operation system 300, such as mobile machines 100. Communication system 306 can include one or more of wired communication circuitry and wireless communication circuitry, as well as wired and wireless communication components. In some examples, communication system 306 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 306 can also include a system that facilitates downloads or transfers of information to and from a secure digital (SD) card or a universal serial bus (USB) card, or both. In communicating with other items of worksite operation system 300, communication system can utilize networks 359.

FIG. 2A also shows that remote computing systems 200 include time estimation system 310. Time estimation system 310 generates one or more time estimation outputs, such as one or more estimated time to complete outputs or one or more estimated time remaining outputs, or both. Time estimation system 310 and the time estimation outputs will be discussed in greater detail further below. FIG. 2 also shows that remote computing systems 200 include control output system 312 generates and outputs one or more control outputs useable to control one or more mobile machines 100. The control outputs can include routes, scheduling (e.g., identifying where to be and when to be there), as well as settings of a mobile machine 100 (e.g., settings of one or more of the controllable subsystems 416). Control output system 312 will be described in greater detail below.

FIG. 2A also shows remote users 366 interacting with mobile machines 100 and remote computing systems 200 through user interfaces mechanisms 364 over networks 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 2A also shows that one or more operators 360 may operate mobile machines 100. The operators 360 interact with operator interface mechanisms 418. In some examples, operator interface mechanisms 418 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 418 using touch gestures. These examples described above are provided as illustrative examples and are not intended to limit the scope of the present disclosure. Consequently, other types of operator interface mechanisms 418 may be used and are within the scope of the present disclosure.

Remote computing systems 200 can be a wide variety of different types of systems, or combinations thereof. For example, remote computing systems 200 can be in a remote server environment. Further, remote computing systems 200 can be remote computing systems, such as mobile devices, a remote network, a farm manager system, a vendor system, or a wide variety of other remote systems. In one example, mobile machines 100, can be controlled remotely by remote computing systems 200 or by remote users 366, or both.

In some examples, one or more of the components shown in FIG. 2A as being disposed on mobile machines 100 can be located elsewhere, such as at remote computing systems 200. Similarly, in some examples, one or more of the components shown in FIG. 2A as being disposed on remote computing systems 200 can be located elsewhere, such as on mobile machines 100. Thus, it will be understood that the items in worksite operation system 300 can be distributed in various ways, including ways that differ from the example shown in FIG. 2A. One example of a distribution, different from the example shown in FIG. 2A, will be shown in FIG. 2B.

Figure 2B:
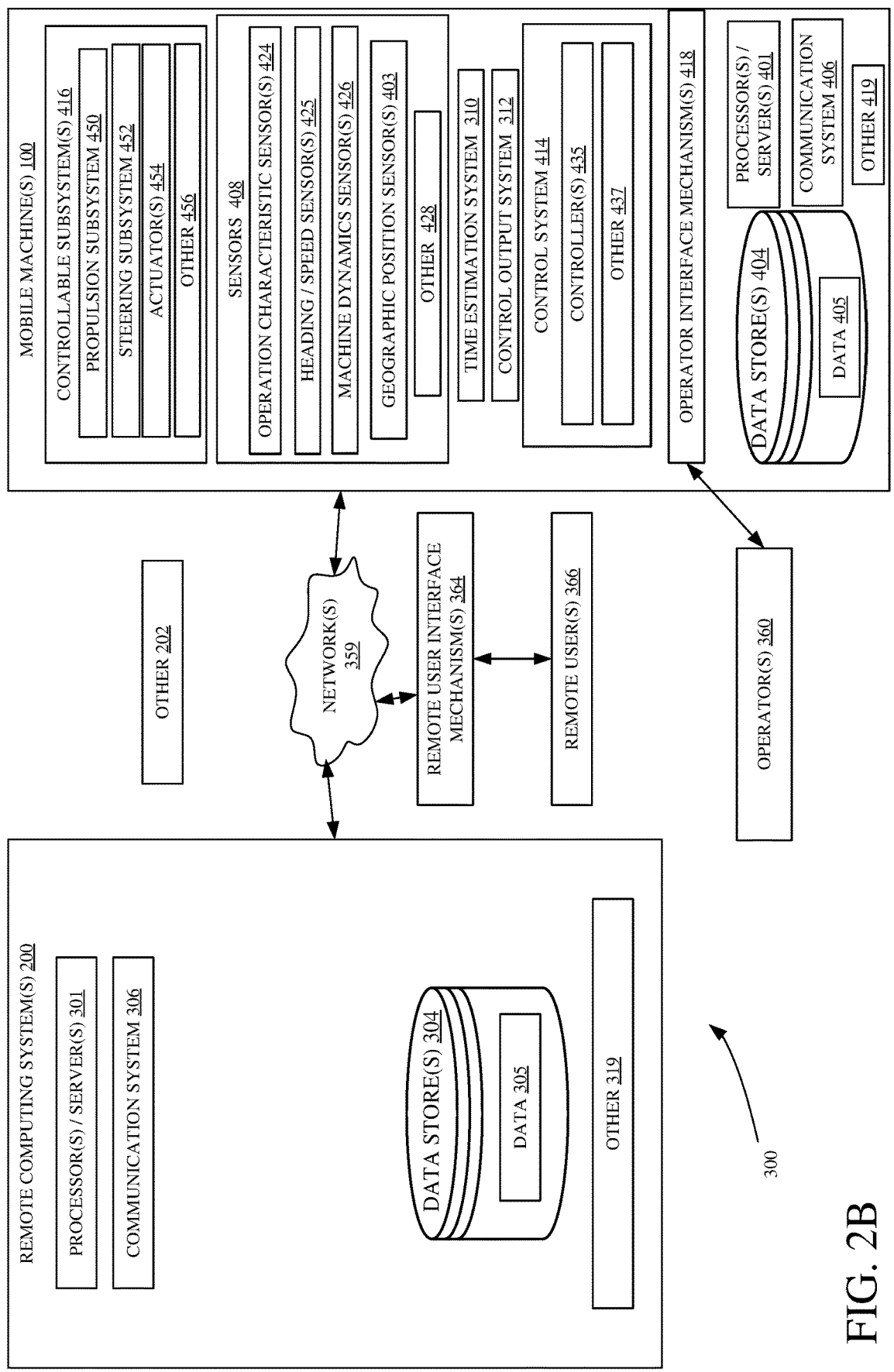
FIG. 2B is a block diagram of one example worksite operation system architecture.

FIG. 2B is a block diagram showing one example of worksite operation system architecture. FIG. 2B is similar to FIG. 2A and thus, similar items are numbered similarly. The example of worksite operation system architecture 300 in FIG. 2B differs from the example of worksite operation system architecture 300 in that time estimation system 310 and control output system 312 are disposed on one or more mobile machines 100 instead of on one or more remote computing systems 200 as in FIG. 2A. In one example, time estimation system 310 and control output system 312 can be disposed on one mobile machine 100 and the outputs of time estimation system 310 and control output system 312 can be shared with other items of worksite operation system architecture 300, including other mobile machines 100, remote computing systems, as well as other items, via communication system 406 and one or more networks 359.

Figure 3:
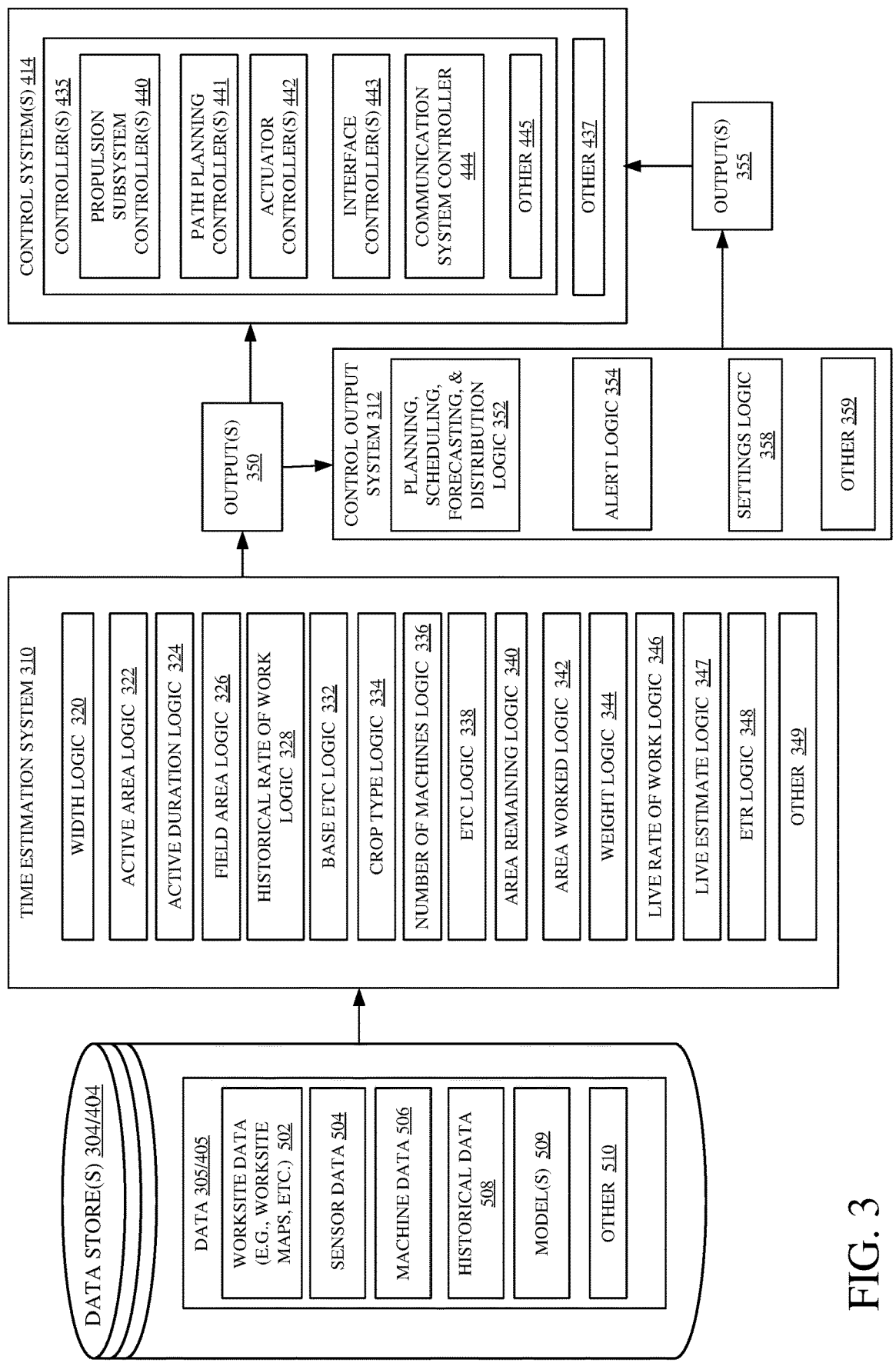
FIG. 3 is a block diagram showing some examples of components of the worksite operation system architecture in more detail.

FIG. 3 is a block diagram that shows examples of some of the components of worksite operation system architecture 300 in more detail and information flow between the components.

As illustrated in FIG. 3, it can be seen that data stores 304 or data stores 404, or both, can include as data, worksite data 502, sensor data 504, machine data 506, historical data 508, one or more models 509, and can include various other data 510, including, but not limited to, other data described elsewhere herein.

As shown in FIG. 3, time estimation system 310 includes width logic 320, active area logic 322, active duration logic 324, field area logic 326, historical rate of work logic 328, base estimated time to complete (ETC) logic 332, crop type logic 334, number of machines logic 336, ETC logic 338, area remaining logic 340, area worked logic 342, weight logic 344, live rate of work logic 346, live estimate logic 347, estimated time remaining (ETR) logic 348, and can include various other items 349 as well.

As shown in FIG. 3, controllers 435 can include one or more propulsion subsystem controllers 440, one or more path planning controllers 441, one or more actuator controllers 442, one or more interface controllers 443, communication system controller 444, and can include various other items 445, including various other controllers.

As shown in FIG. 3, control output system 312 can include planning, scheduling, forecasting, and distribution logic 352, alert logic 354, settings logic 358, and can include various other items 359 as well.

As a general overview, time estimation system 310 is configured to generate one or more outputs 350, such as one or more of the metrics generated by each of its items, including, for example, one or more estimated time to complete (ETC) metrics or one or more estimated time remaining (ETR) metrics, or both, based on data 305 or data 405, or both (depending on how the data is distributed). The outputs 350 are provided to control system 414 or to control output system 312, or both. Control system 414 is operable to generate control signals to control one or more items of worksite operation system architecture 300 based on the one or more outputs 350. Control output system 312 is operable to generate one or more outputs 355, such as one or more planning outputs, one or more scheduling outputs, one or more distribution outputs, one or more alert outputs, and one or more settings outputs. Outputs 355 can be provided to control system 414 which is operable to generate control signals to control one or more items of worksite operation system architecture 300 based on the one or more outputs 355.

Worksite data 502 includes data indicative of characteristics of one or more worksites (e.g., fields), which can include georeferenced worksite data such worksite maps. Such characteristics can include crop characteristics (e.g., crop type, etc.), terrain characteristics (e.g., topography), soil characteristics, as well as various other worksite characteristics. Worksite data 502 can also include worksite dimensions, including dimensions of sub-areas of the worksite. For instance, a worksite, such as a field, may have a general area (e.g., a field area) that is of a given dimension (e.g., 100 acres). The field may also have portions with given areas, such as an active area (e.g., area where crop is located or is to be located) of a given dimension (e.g., 95 acres) and a non-active area (e.g., area where crop is not located or is not to be located, such as headlands) of a given dimension (e.g., 5 acres). Worksite data 502 can include various other data indicative of various other characteristics of the worksite.

Sensor data 504 includes data generated by sensors 408, including operation characteristic sensor data generated by operation characteristic sensors 424, heading and speed sensor data generated by heading/speed sensors 425, machine dynamics sensor data generated by machine dynamics sensors 426, geographic position sensor data generated by geographic position sensors 304, as well as various other sensor data generated by various other sensors 428. Sensor data 504 can be historical sensor data generated in one or more prior operations as well as current sensor data generated during one or more current operations.

Machine data 506 includes various data indicative of characteristics of the machine such as machine ID, machine type, machine dimensions (e.g., width, length, height, etc.), machine configuration, as well as various other data indicative of various other machine characteristics.

Historical data 508 includes various historical data relative to historical operations, such as historical data of worksites of the prior operations, historical data of machines of prior operations, and historical data of machine performance of prior operations. In one example, historical data 508 includes, for each historical operation, a corresponding historical active area metric (e.g., 602), a historical active duration metric (e.g., 604), and a historical width metric (e.g., 600). The historical performance data can be categorized in various ways including by specific machine, by machine type, by operation (e.g., harvesting, planting, spraying, etc.), by operation of given crop type (e.g., planting corn or planting soybean, etc.), as well as by organization.

Models 509 can include various models, including estimated time to complete (ETC) models configured to receive one or more inputs and provide, as a model output, an ETC metric. In one example, a model 509 can be a machine learning (or machine learned) model. The model 509 can be a linear machine learning model or a non-linear machine learning model. In one example, the model 509 is a machine learning model such as a linear regression model, for example, a gamma based generalized linear regression model. Other types of machine learning and machine learning models are contemplated herein. In one example, a model 509 is configured to receive, as model inputs, a base ETC metric, a number of machines to perform an operation, a crop type corresponding to the operation to be performed, and a field area metric indicative of a general area of a worksite (e.g., field) at which the operation is to be performed.

Figure 4:
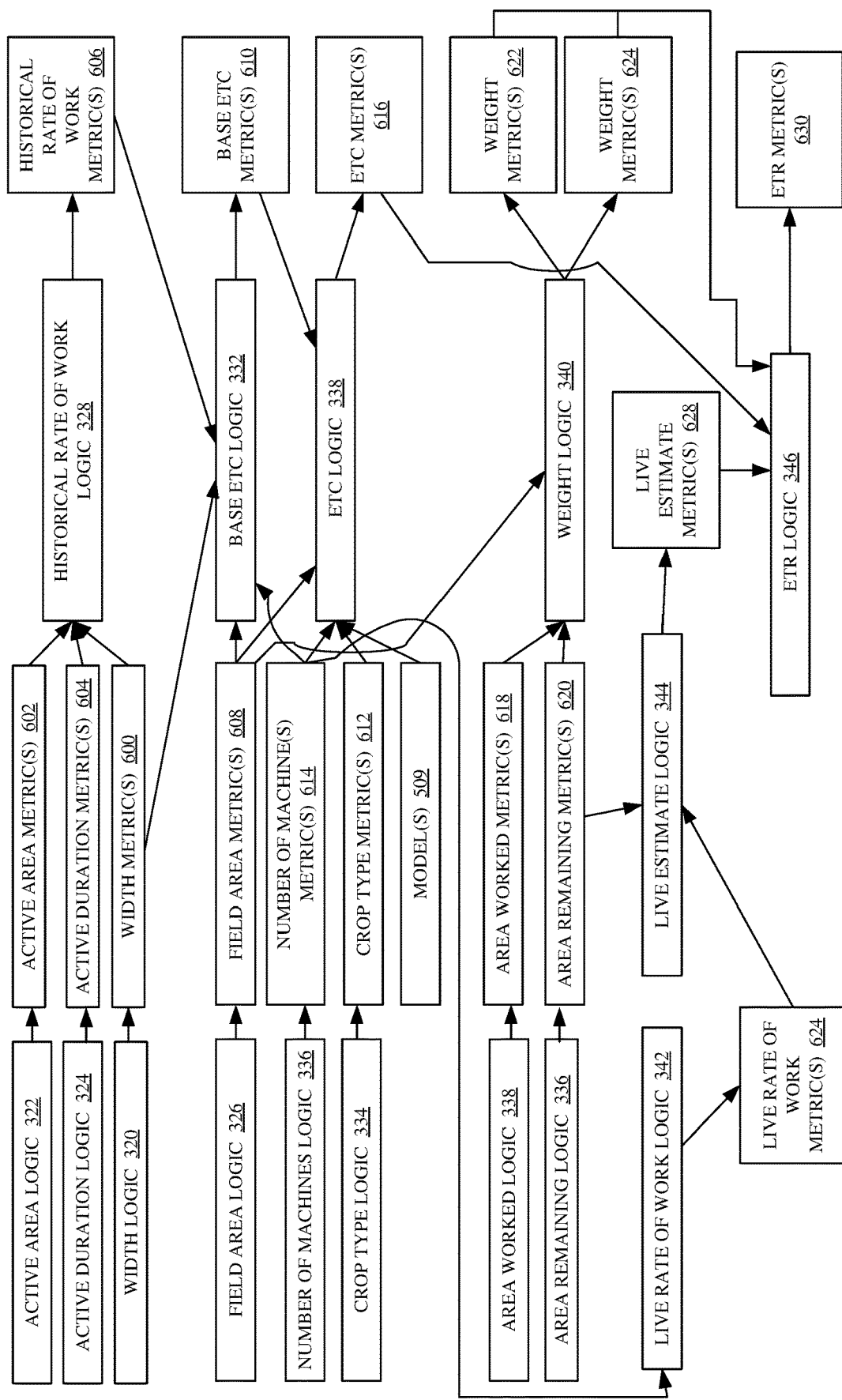
FIG. 4 is a block diagram showing some examples of components of the worksite operation system architecture in more detail.

Discussion will now proceed to FIG. 4. FIG. 4 is a block diagram showing some components of worksite operation system architecture 300 in more detail and information flow among the components.

As shown in FIG. 4, historical rate of work logic 328 generates a historical rate of work metric 600 indicative of a historical rate at which work is performed. The historical rate of work metric can be on a machine level (e.g., specific to a given machine or a given machine type), on an organization level (e.g., across all the machines of the organization), or an operation type level (e.g., harvesting, planting, or spraying or further categorized into operation type with specific crop type). In one example, the historical rate of work logic 328 generates a historical rate of work metric 600 based on one or more active area metrics 602 generated by active area logic 602, one or more active duration metrics 604 generated by active duration logic 324, and one or more width metrics 600 generated by width logic 320.

A width metric 600 is a metric indicative of a width of mobile machine 100, such as an operating width or swath width, which may correspond to a width of a tool or implement (e.g., spray boom, harvester header, planting implement, etc.) of the machine. Width logic 320 can generate a width metric 600 based on machine data 506.

An active area metric 602 is a metric indicative of a dimension (e.g., acreage) of an area that is worked or to be worked (e.g., area of a field at which crop is or is to be) as distinguished from a general area of the worksite or from a non-active area. Active area logic 322 can generate an active area metric 602 based on worksite data 502 or based on machine sensor data 402 indicating geographic locations on the field at which the machine 100 was actively performing a previous operation, or both.

An active duration metric 604 is a metric indicative of an amount of time that a mobile machine 100 is actively performing an operation (e.g., an amount of time that the machine 100 is planting, or harvesting, or spraying, etc.).

Active duration logic 324 can generate an active duration metric 604 based on machine sensor data 402 indicating an amount of time during which the machine 100 was actively performing its operation, such as sensor data indicative of an amount of time during which one or more actuators 454 (e.g., valves or pumps of a sprayer, meters, pumps, or valves of a planter, actuators that drive crop processing subsystems of a harvester, etc.), that operating during active operation of the machine 100, were operating.

Thus, it can be seen that the historical rate of work metric 600 takes into account non-active time of the mobile machines 100, such as times when the machines are operating in non-active areas (e.g., in headlands) or not performing active operation such as when the machine is waiting (e.g., not moving) and tendering (e.g., receiving more material to be applied to the worksite), as well as various other non-active times.

In one example, a historical rate of work metric 606 is generated based on the following equation:

$$\text{Historical rate of work}_{acrphft} = \frac{\sum_{1}^{n} \text{Active area}_{acr}/\text{width}_{ft}}{\sum_{1}^{n} \text{Active duration}_{h}} \quad \text{Equation 1}$$

where Active area$_{acr}$ is the active area metric 602, Width$_{ft}$ is a width metric 600, Active durationh is the active duration metric 604 and Historical rate of work$_{acrphft}$ is the historical rate of work metric 606. Thus, in one example, historical rate of work logic 602, takes, for "n" operations (any number of operations) a summation of (an active area metric 602/a width metric for each operation in the "n" number of operations)/summation of an active duration metric 604 for each operation in the "n" number of operations to generate the historical rate of work metric 606. The metrics used in the summations can be done on different levels. In one example, the metrics may be on a machine level, that is, they are from prior operations by a same machine. In one example, the metrics may be on an organization level, that is, they are from prior operations by machines of the same organization (e.g., same farm). In one example, they are from prior operations by machines performing the same type of operation. The data can be further categorized to be of the same worksite.

Using different levels of data may be advantageous where data for one level is unavailable or is otherwise of an undesirable size.

As shown in FIG. 4, base ETC logic 332 generates abase ETC metric 610 indicative of a base estimate of time to complete an operation. In one example, base ETC 332 logic generates a base ETC metric 610 based on a field area metric 608 generated by field area logic 326, based on a width metric 600 generated by width logic 320, based on a historical rate of work metric 606 generated by historical rate of work logic 328, and based on a number of machines metric 614 generated by number of machines logic 336.

Width area metric 600 was previously described, and, in one example, as used by base ETC logic, may be a width metric 600 specific to the machine 100 to carry out the operation for which the base ETC metric 610 is being generated or, where multiple machines 100 are to perform the operation, may be a width metric 600 that is an aggregation of the individual with metrics 600 for each machine 100.

A field (or worksite) area metric 608 is a metric indicative of the general area (e.g., acres) of a worksite and, in one example, as used by base ETC logic 332, may be a field area metric 608 specific to the worksite for which the base ETC metric 610 is being generated. Field area logic 326 can generate a field area metric 608 based on worksite data 502.

A number of machines metric 614 is a metric indicative of a number of machines, and, in one example, as used by based ETC logic 332, may be a number of machines metric 614 that indicates the number of machines to perform the operation for which the base ETC metric 610 is being generated. Number of machines logic 336 can generate a number of machines metric 614 based on machine data 506.

In one example, a base ETC metric 610 is generated based on the following equation:

$$\text{Base } ETC_h = \frac{\text{Field area}_{acr}}{\sum_{1}^{n} \text{Historical rate of work}_{acrphft} * \text{Width}_{ft}} \quad \text{Equation 2}$$

where Field area$_{acr}$ is the field area metric 608, Historical rate of work$_{acrphft}$ is the historical rate of work metric 606, Width$_{ft}$ is the width metric 600, and Base ETC$_h$ is the base ETC metric 610. Thus, in one example, base ETC logic 332 takes, for "n" machines performing the corresponding operation (any number of machines may perform the operation and can be indicated by number of machines metric 614) a summation of (a historical rate of work metric 606 multiplied by a width metric 600 for each machine in the "n" number of machines). The field area metric 608 is divided by the summation to generate the base ETC metric 610.

As shown in FIG. 4, ETC logic 338 generates an ETC metric 616 indicative of an estimated time to complete (ETC) a given operation that is to be performed. In one example, ETC logic 338 generates an ETC metric 616 based on a model 509, a base ETC metric 610 generated by base ETC logic 332, a crop type metric 612 generated by crop type logic 334, a number of machines metric 614 generated by number of machines logic 336, and on a field area metric 608 generated by field area logic 326.

Base ETC metric 610 was previously described, and, in one example, as used by ETC logic 338, may be a base ETC metric 610 specific to the operation to be performed for which the ETC metric 610 is being generated.

A crop type metric 612 is a metric indicative of a crop type, and, in one example, as used by ETC logic 338, may be a crop type metric 612 specific to the crop type of the worksite for which the ETC metric 616 is being generated. Each crop type may be represented by an arbitrary metric in the form of a number (or other value), for instance corn may be represented by the number one or by letter C, for instance. Crop type logic 334 can generate a crop type metric 612 based on worksite data 502.

Number of machines metric 614 was previously described, and, in one example, as used by ETC logic 338, may be a number of machines metric 614 specific to the operation to be performed, for which the ETC metric 616 is being generated.

Field area metric 608 was previously described, and, in one example, as used by ETC logic 338, may be a field area metric 608 specific to the worksite at which the operation to be performed, for which the ETC metric 616 is being generated, is to take place.

In one example, model 509 is a machine learning model. Model 509 can be a linear machine learning model or a non-linear machine learning model. In one example, model 509 is a machine learning model in the form of a linear regression model, such as a gamma based generalized linear regression model. In one example, model 509 is trained based on a base ETC metric 610, a crop type metric 612, a number of machines metric 614, and a field area metric 608 for each historical operation of a plurality of historical operations. Thus, it can be seen that ETC metric 616 accounts for variability (e.g., logistical inefficiencies) associated with a number of machines, as well as variability (e.g., speed, etc.) associated with the type of crop corresponding to the operation. Thus, ETC metric 616 can also be considered a corrected metric (e.g., a corrected base ETC metric) as it corrects for bias (or inaccuracy) due to variation associated with the number of machines performing the operation and variation associated with the crop type corresponding to the operation. Additionally, or alternatively, in other examples, the model 509 can also be trained based on machine type (or machine form) with a corresponding machine type (or machine form) metric for each historical operation of a plurality of historical operations. In such an example, a machine type (or machine form) metric could be generated and provided as an input to the model 509 in generating the ETC metric 616. Thus, the ETC metric 616 can account for variability associated with machine type (or machine form).

In one example, ETC logic 338 provides, as inputs to model 509, a base ETC metric 610, a number of machines metric 614, a crop type metric 612, and a field area metric 608, to generate an ETC metric 616. The model 509 generates, as a model output, the ETC metric 616 based on the provided inputs. This example operation of ETC logic 338 can be expressed with the following equation:

$$ETC_h = \text{MLmodel}(\text{Base } ETC_h, \text{Number of machines}, \text{Crop Type}, \text{Field area}_{acr}) \quad \text{Equation 3}$$

where MLmodel is model 509, Base $ETC_h$ is the base ETC metric 610, Number of machines is the number of machines metric 614, Crop Type is the crop type metric 612, Field area$_{acr}$ is the field area metric 608, and $ETC_h$ is the ETC metric 616.

FIG. 4 shows that weight logic 340 generates one or more first weight metrics 622 and one or more second weight metrics 624. As will be discussed further below, a first weight metric and a second weight metric are used in the generation of an estimated time remaining (ETR) metric 630.

Weight logic 340 generates a first weight metric 622 based on a field area metric and an area reaming metric 620.

Field area metric 608 was previously described, and, in one example, as used by weight logic 340, may be a field area metric 608 specific to the worksite at which an operation, for which an ETR metric 630 is being generated, is being performed.

An area remaining metric 620 is a metric that is indicative of a remaining amount of active area of a worksite yet to be worked in an operation being performed, and, in one example, as used by ETR logic 346, may be an area remaining metric 620 specific to the worksite at which the operation, for which an ETR metric 630 is being generated, is being performed. Area remaining logic 336 can generate an area remaining metric 620 based on worksite data 502 as well as sensor data 504 that indicates the amount of active area of the worksite that the machine(s) performing the operation have already worked in the currently performed operation.

In one example, a weight metric 622 is generated based on the following equation:

$$\text{Weight}_1 = \frac{\text{Area remaining}_{acr}}{\text{Field area}_{acr}} \quad \text{Equation 4}$$

where Area remaining$_{acr}$ is the area remaining metric 620, Field area$_{acr}$ is the field area metric 608, and Weight$_1$ is the weight metric 622.

Weight logic 340 generates a second weight metric 624 based on a field area metric 608 and an area worked metric 618.

Field area metric 608 was previously described, and, in one example, as used by weight logic 340, may be a field area metric 608 specific to the worksite at which an operation, for which an ETR metric 630 is being generated, is being performed.

An area worked metric 618 is a metric that is indicative of a remaining amount of active area of a worksite that has been worked in an operation being performed, and, in one example, as used by ETR logic 346, may be an area worked metric 618 specific to the worksite at which the operation, for which an ETR metric 630 is being generated, is being performed. Area worked logic 338 can generate an area worked metric 618 based on sensor data 504 that indicates the amount of active area of the worksite that the machine(s) performing the operation have already worked in the currently performed operation.

In one example, a weight metric 624 is generated based on the following equation:

$$\text{Weight}_2 = \frac{\text{Area worked}_{acr}}{\text{Field area}_{acr}} \quad \text{Equation 5}$$

where Area worked$_{acr}$ is the area worked metric 618, Field area$_{acr}$ is the field area metric 608, and Weight$_2$ is the weight metric 624.

FIG. 4 shows that live estimate logic 344 generates one or more live estimate metrics 628 indicative of a live estimate of the amount of time remaining until the operation currently being performed is completed. In one example, live estimate logic 344 generates a live estimate metric 628 based on an area remaining metric 620 generated by area remaining logic 336 and a live rate of work metric 626 generated by live rate of work logic 342.

Area remaining metric 620 was previously described, and, in one example, as used by live estimate logic 344, may be an area remaining metric 620 specific to the worksite at which the operation, for which the live estimate metric 628 is being generated, is being performed.

Live rate of work metric 626 is a metric indicative of a rate at which active area is being worked in operation being performed, and, in one example, as used by live estimate logic 344, may be a live rate of work metric 626 specific to the operation for which the live estimate metric 628 is being generated. Live rate of work logic 342 can generate a live rate of work metric 626 based on sensor data 504 that indicates the rate at which the active area of the worksite is being actively worked by machine(s) performing the operation. In some examples, generating the live rate of work metric 626, includes accounting for unique area worked by each machine performing the operation. For example, where multiple machines are performing the operation, the machines may go over areas of the field already worked by other machines and this overlap will be filtered out in calculating the live rate of work metric 626. In other examples, whether multiple machines perform the operation or not, a machine may go over area of the worksite it has, itself, already worked, and this overlap will be filtered out in calculating the live rate of work metric 626. By accounting for overlap (e.g., filtering out overlap), only area of the worksite that is uniquely worked by the specific machine will be used. In one example, live rate of work logic 342, to generate the live rate of work metric 626, takes for "n" machines performing the corresponding operation (any number of machines may perform the operation and can be indicated by number of machines metric 614) a summation of (a unique area worked metric (indicative of a unique area worked by the corresponding machine)/duration worked metric (indicative of an amount of time that the corresponding machine has operated to work the unique area) for each machine in the "n" number of machines.

In one example, a live estimate metric 628 is generated based on the following equation:

$$\text{Live estimate}_h = \frac{\text{Area remaining}_{acr}}{\text{Live rate of work}_{acrph}} \quad \text{Equation 6}$$

where Area remaining$_{acr}$ is the area remaining metric 620, Live rate of work$_{acrph}$ is the live rate of work metric 626, and Live estimate$_h$ is the live estimate metric 628.

FIG. 4 shows that ETR logic 346 generates one or more ETR metrics 630 indicative of an estimated time remaining until a current operation being performed will be completed. In one example, ETR logic 346 generates an ETR metric 630 based on an ETC metric 616 generated by ETC logic 338, a weight metric 622 generated by weight logic 340, a live estimate metric 628 generated by live estimate logic 344, and a weight metric 624 generated by weight logic 340.

ETC metric 616 was previously described, and, in one example, as used by ETR logic 346, may be an ETC metric 616 specific to the operation being performed for which the ETR metric 630 is being generated.

Weight metric 622 was previously described, and, in one example, as used by ETR logic 346, may be a weight metric 622 specific to the operation being performed for which the ETR metric 630 is being generated.

Live estimate metric 628 was previously described, and, in one example, as used by ETR logic 346, may be a live estimate metric specific to the operation being performed for which the ETR metric 630 is being generated.

Weight metric 624 was previously described, and, in one example, as used by ETR logic 346, may be a weight metric 624 specific to the operation being performed for which the ETR metric 630 is being generated.

In one example, an ETR metric 630 is generated based on the following equation:

$$ETR_h = (\text{Weight}_1 * (\text{Weight}_1 * ETC_h)) + (\text{Weight}_2 * \text{Live estimate}_h) \quad \text{Equation 7}$$

where $ETR_h$ is ETR metric 630, Weight$_1$ is weight metric 622, $ETC_h$ is ETC metric 616, Weight$_2$ is weight metric 624, and Live estimate$_h$ is live estimate metric 628.

As can be seen, the ETR metric 630 maintains a historical-based aspect, to accommodate for behavior in past operations, and also accounts for variability that might occur due to conditions at the worksite currently being performed. More weight is given to the live estimate metric 628 as the operation progresses, that is, the weight metric 624 (applied to live estimate metric 628) increases as the mobile machine 100 completes more work at the worksite during the operation. Additionally, the weight metric 622 (applied to ETC metric 616) decreases as the mobile machine 100 completes more work at the worksite during the operation. While FIG. shows specific examples of how weight metric 622 and weight metric 624 are generated, in other examples, weight metric 622 or weight metric 624, or both, can be generated in other way, including by different subordinate algorithms.

Discussion returns to FIG. 3 where it can be seen the time estimation system 310 provides one or more outputs 350 which may include one or more of each one of the metrics 600 through 630 shown in FIG. 4.

The one or more outputs 350 may be provided to one or more control systems 414 to control one or more mobile machines 100 or other components of worksite operation system architecture 300. For example, propulsion subsystem controllers 440 can generated control signals to control propulsion subsystem 450 to control a travel speed of a mobile machine 100 based on the one or more outputs 350 (e.g., based on an ETC metric 616 or based on an ETR metric 630, or both). Additionally, or alternatively, path planning controllers 441 can generate control signals to control steering subsystem 352 to control a heading of a mobile machine 100 based on the one or more outputs 350 (e.g., based on an ETC metric 616 or based on an ETR metric 630, or both). Additionally, or alternatively, actuator controllers 442 can generate control signals to control actuators 454 to control one or more operating characteristics (e.g., settings) of a mobile machine 100 based the one or more outputs 350 (e.g., based on an ETC metric 616 or based on an ETR metric 630, or both). Additionally, or alternatively, interface controllers 443 can generated control signals to control one or more interface mechanisms (e.g., 318 or 364) to generate an indication (e.g., generate a display, etc.) based on the one or more outputs 350 (e.g., based on an ETC metric or based on an ETR metric 630, or both). Alternatively, or additionally, communication system controller 444 can generate control signals to control communication system 406 to communicate the one or more outputs 350 (or data thereof) with other items of a mobile machine 100 or of worksite operation system architecture 300 based on the one or more outputs 350 (e.g., based on an ETC metric 616 or based on an ETR metric 630, or both). These are merely some examples.

The one or more outputs 350 may be provided to control output system 312. Control output system 312 may generate one or more outputs 355 based on the one or more outputs 350 (e.g., based on an ETC metric 616 or based on an ETR metric 630, or both). For example, planning, scheduling, forecasting, and distribution logic 352 may set or adjust the plan for conducting the operations, scheduling of operations, forecasting (such as forecasting a total workload for a mobile machine 100 or forecasting a total workload across a plurality of mobile machines 100 (e.g., a fleet), or both), or distribution of machines based on the one or more outputs 350 (e.g., based on an ETC metric 616 or based on an ETR metric 630, or both) and provide such as an output 355. It will be understood that outputs provided by planning, scheduling, and distribution logic 352 can include one or more routes for each of one or more mobile machines 100 as well as a schedule for each of one or more mobile machines 100. Additionally, or alternatively, alert logic 354 may generate, as output(s) 355, one or more alerts which can be indicated (e.g., displayed) by one or more interface mechanisms (e.g., 418, 364, etc.). For example, alert logic 354 may compare an ETC metric 618 to a corresponding ETR metric 630, and where the ETC metric 618 and the corresponding ETR metric deviate (e.g., deviate by a threshold amount (e.g., a deviation threshold)) an alert can be generated and provided (e.g., displayed, etc.) to an operator 360 or user 364, or both, to indicate to the operator 360 or user 364, or both, the divergence. Additionally, or alternatively, settings logic 358 may set or adjust settings (e.g., travel speed, heading or route, settings of one or more actuators 454) for one or more mobile machines 100 based on the one or more outputs 650 (e.g., based on an ETC metric 616 or based on an ETR metric 630, or both) and provide such as an output 355.

The one or more outputs 355 may be provided to one or more control systems 414 to control one or more mobile machines 100 or other components of worksite operation system architecture 300. For example, propulsion subsystem controllers 440 can generate control signals to control propulsion subsystem 450 to control a travel speed of a mobile machine 100 based on the one or more outputs 355. Additionally, or alternatively, path planning controllers 441 can generate control signals to control steering subsystem 352 to control a heading of a mobile machine 100 based on the one or more outputs 355. Additionally, or alternatively, actuator controllers 442 can generate control signals to control actuators 454 to control one or more operating characteristics (e.g., settings) of a mobile machine 100 based the one or more outputs 355. Additionally, or alternatively, interface controllers 443 can generate control signals to control one or more interface mechanisms (e.g., 318 or 364) to generate an indication (e.g., generate a display, etc.) based on the one or more outputs 355. Alternatively, or additionally, communication system controller 444 can generate control signals to control communication system 406 to communicate the one or more outputs 355 (or data thereof) with other items of a mobile machine 100 or of worksite operation system architecture 300 based on the one or more outputs 355. These are merely some examples.

It will be understood that various units are referred to in the equations noted above. For example, h for hours, ft for feet, and acr for acres. It will be noted that in other examples, the units can vary, for example, units of time other than hours can instead be used, units of area other than acres can instead be used, and units of dimension other than feet can instead be used.

Figure 5:
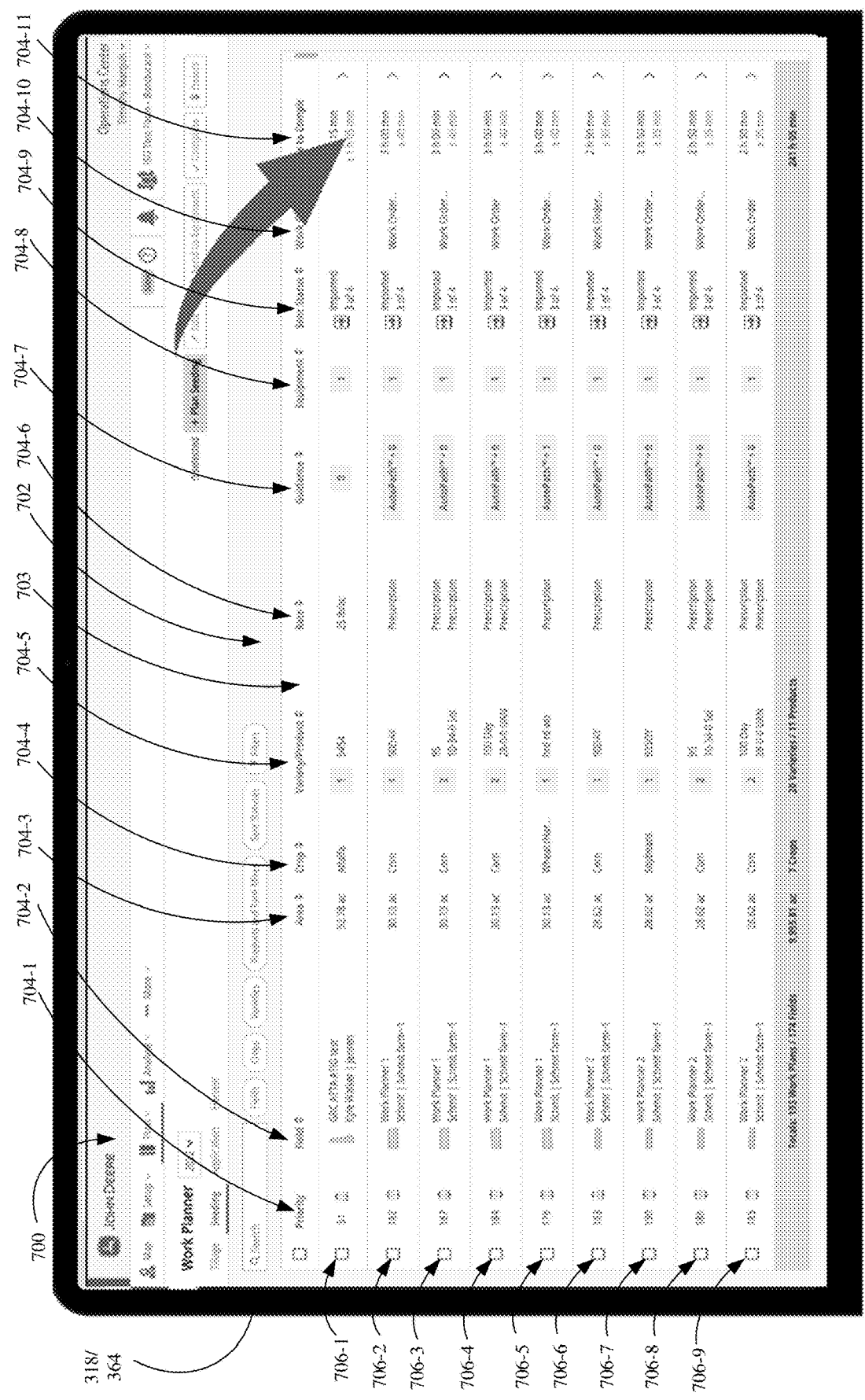
FIG. 5 is a pictorial illustration showing one example interface displayable on an interface mechanism.

FIG. 5 is a pictorial illustration showing one example interface 700 that can be generated (e.g., by an interface controller 443) and displayed on an interface mechanism (e.g., 318 or 364, or both). Interface 700 is an example ETC interface. As shown in FIG. 5, interface 700 includes a ETC display portion 702, illustratively a table display element 703, that includes a plurality of columns 704 (shown as 704-1 through 704-11) and rows 706 (shown as 706-1 through 706-9), each column 704 corresponding to a respective item of information and having respective information for each row 706. It will be understood that the number of columns 704 and rows 706 may vary, and, in some examples, may be controlled by an operator 360 or a user 366. Additionally, in the illustrated example, interface 700 is shown as an example interface that is generated for planting operations. In other examples, interface 700 can be for a variety of other types of operations, including, but not limited to harvesting operations or spraying operations.

Column 704-1 is a priority column that provides, in each row 706, a display element (a textual number) that indicates a priority of the given operation to which each row 706 corresponds. The priority may be set by an operator 360 or a user 366 or may be set in other ways.

Column 704-2 is a worksite (e.g., field) identification column that provides, in each row, display elements (textual and non textual display elements in the example) that indicate the worksite (e.g., field) corresponding to the operation to which each row 706 corresponds. As can be seen in the illustrated example, one of the display elements in each row is a graphical representation of the field.

Column 704-3 is a worksite (e.g., field) area identification column that provides, in each row 706, a display element (a textual number in the example) that indicates a size or dimension (e.g., acreage) of the worksite (e.g., field) corresponding to the operation to which each row 706 corresponds.

Column 704-4 is a crop type identification column that provides, in each row 706, a display element (textual word in the example) that indicates a type of crop of at the worksite or to be at the worksite corresponding to the operation to which each row 706 corresponds.

Column 704-5 is variety/product identification column that provides, in each row 706, a display element (textual number in the example) that identifies the amount of different crop varieties/products in the worksite or to be used in the field and display element(s) (combination of textual words, letters, numbers, or combination in the example) that indicates the varieties/products in the worksite or to be at the worksite corresponding to the operation to which each row 706 corresponds.

Column 704-6 is a setting identification column that provides, in each row 706, a display element (textual words, letters, numbers, or combination in the example) that indicates a setting at which one or more mobile machine(s) are to operate in worksite corresponding to the operation to which each row 706 corresponds.

Column 704-7 is an automated guidance identification column that provides, in each row, a display element (textual words, letters, numbers, or a combination in the example) that indicates whether or not automated route guidance functionality is to be used by one or more machines 100 (or whether the machine has automated guidance functionality) corresponding to the operation to which each row 706 corresponds.

Column 704-8 is a machine number identification column that provides, in each row, a display element (textual number in the example) that indicates the number of machines 100 to be used in the operation to which each row 706 corresponds.

Column 704-9 is a sent status identification column that provides, in each row, a display element (textual words, letters, numbers, or a combination in the example) that indicates the sent status corresponding to the operation to which each row 706 corresponds. Sent status is an indicator that indicates whether a work plan is being worked on, modified, sent or imported onto a machine display.

Column 704-10 is a work order identification column that provides, in each row, a display element (textual words, letters, numbers, or a combination in the example) that indicates the work order identifier corresponding to the operation to which each row 706 corresponds.

Column 704-11 is an ETC identification column that provides, in each row, a display elements (textual words, letters, numbers, symbols, or a combination in the example) to indicate the ETC metric 616 corresponding to the operation to which each row 706 corresponds and to indicate a plus or minus corresponding to the respective ETC metric 616 (indicating an estimated range by which the ETC metric 616 can reasonably be expected to vary).

Thus, it can be seen that an ETC interface, such as interface 700, can be generated and displayed that shows an ETC metric corresponding to an operation at a worksite or a plurality of ETC metrics, each ETC metric corresponding to a respective operation at a respective worksite. The ETC metric or the plurality of ETC metrics can be displayed along with various other data, such as the various other data described in FIG. 5.

Figure 6:
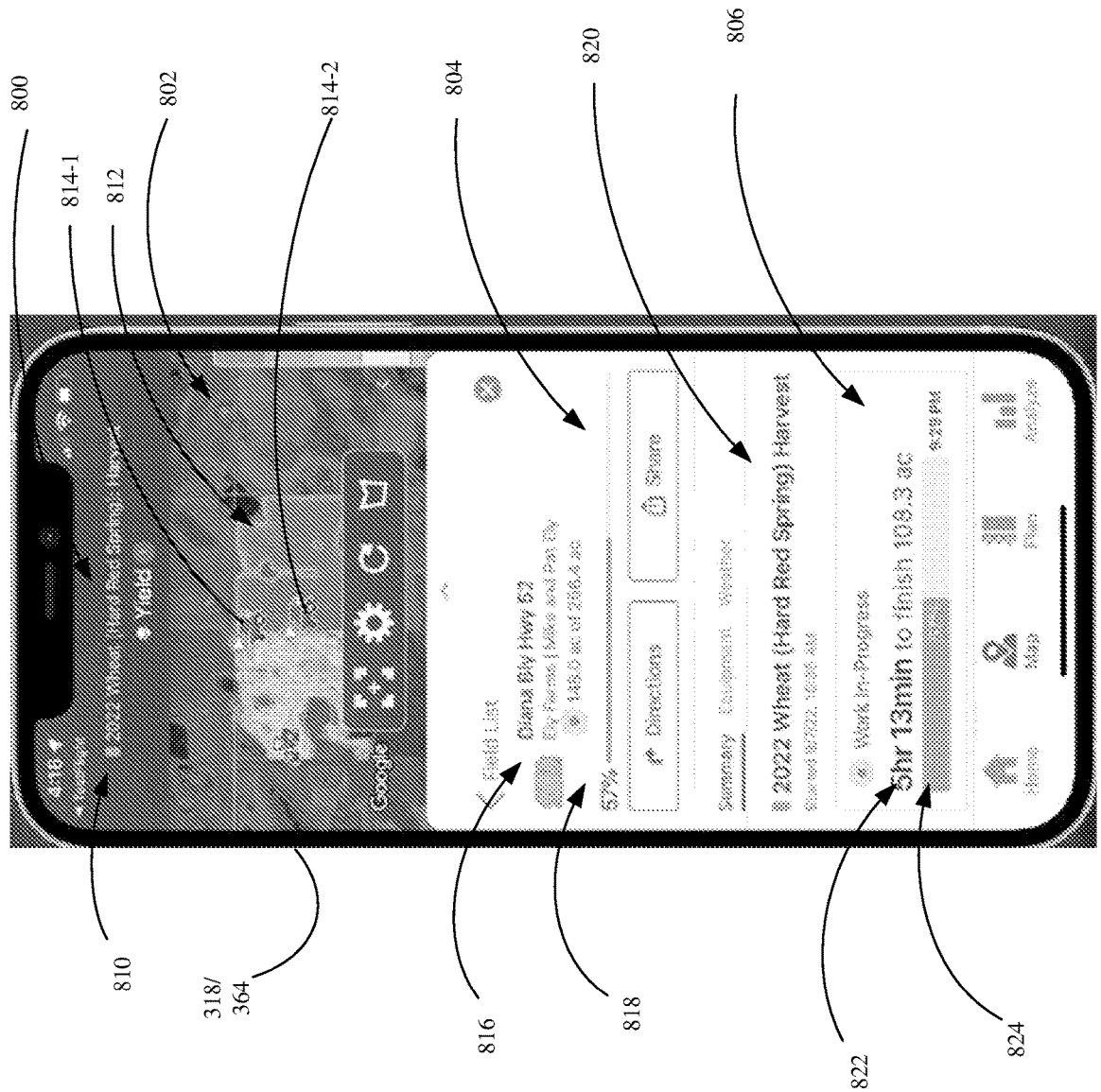
FIG. 6 is a pictorial illustration showing one example interface displayable on an interface mechanism.

FIG. 6 is a pictorial illustration showing one example interface 800 that can be generated (e.g., by an interface controller 443) and displayed on an interface mechanism (e.g., 318 or 364, or both). Interface 800 is an example ETR interface. Interface 800 includes a map display portion 802, a worksite information display portion 804, and an ETR display portion 806.

Worksite display portion 802 includes a an operation identifier display element 810 that provides textual (numbers, words, letters, or combination in the example) indication of the operation to which the interface corresponds, a map display element 810 that indicates a map of the worksite at which the operation, indicated by display element 810, is taking place, and mobile machine display elements 814 (shown as 814-1 and 814-2) that indicate the position of the mobile machines 100 performing the operation at their locations in the worksite.

Worksite information display portion 804 includes identifier display elements 816 that provide textual (words, letters, numbers, or combination in the example) identification of the worksite and that provide non textual (graphical representation of the worksite in the example) identification of the worksite. Worksite information display portion 804 further includes a completion tracker display elements 818 that provide textual (percentage in the example) indication of the completion of the operation and that provide non textual (graphical bar that is filled in to represent the completion in the example) indication of the completion of the operation.

ETR display portion 806 includes operation identifier display element 820 that provides textual (numbers, words, letters, or combination in the example) indication of the operation to which the interface corresponds. ETR display portion 806 further includes an ETR display element 822 that provides indication (textual numbers, words, letters, or combination in the example) of the ETR metric 630 corresponding to the operation. ETR display portion 806 further includes completion tracker display elements 824 that provide textual (percentage in the example) indication of the completion of the operation and that provide non textual (graphical bar that is filled in to represent the completion in the example) indication of the completion of the operation.

Figure 7A:
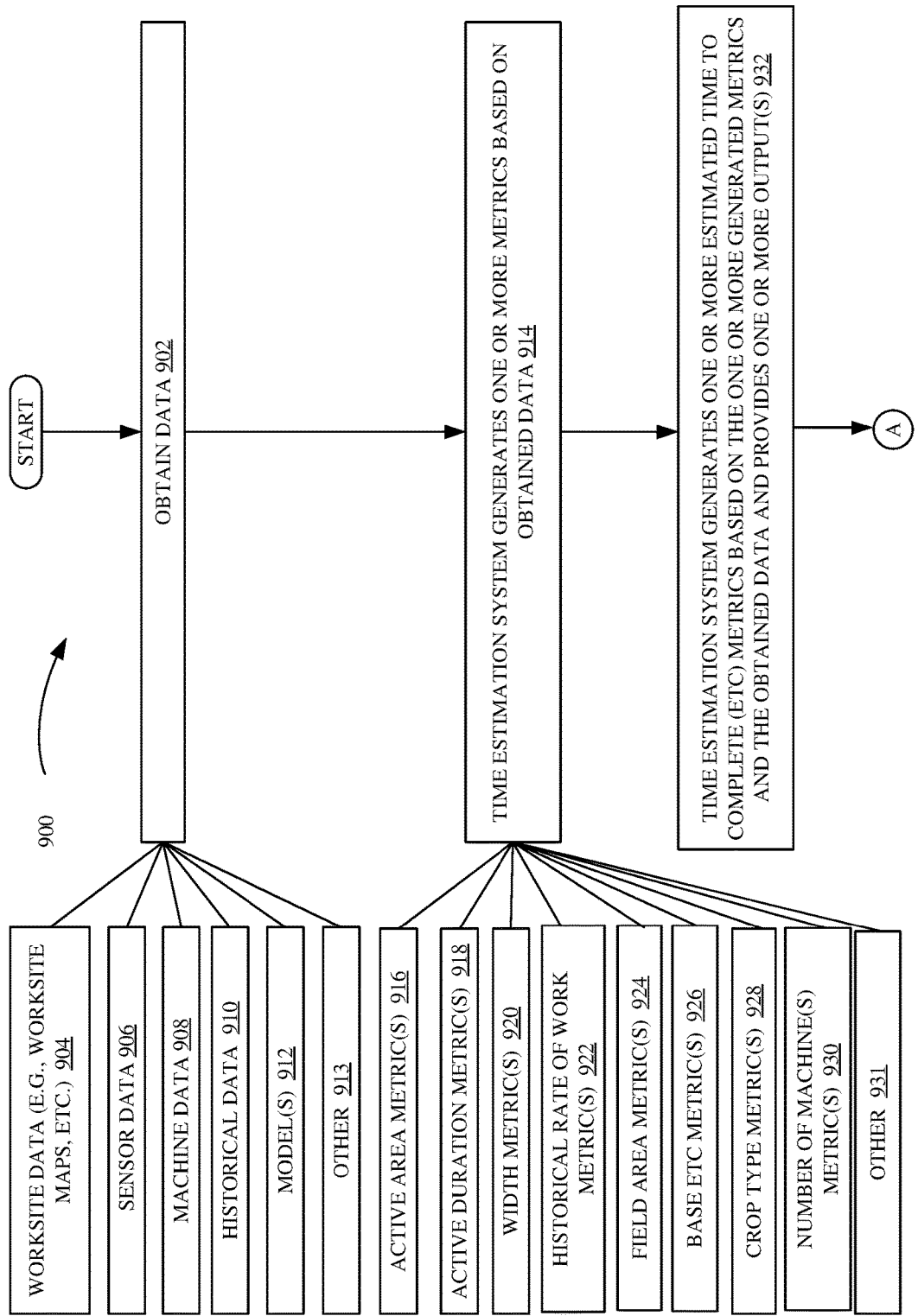
FIGS. 7A-7C (collectively referred to herein as FIG. 7) is a flow diagram showing one example operation of a worksite operation system architecture in generating an estimated time to complete (ETC) and an estimated time remaining (ETR).
Figure 7B:
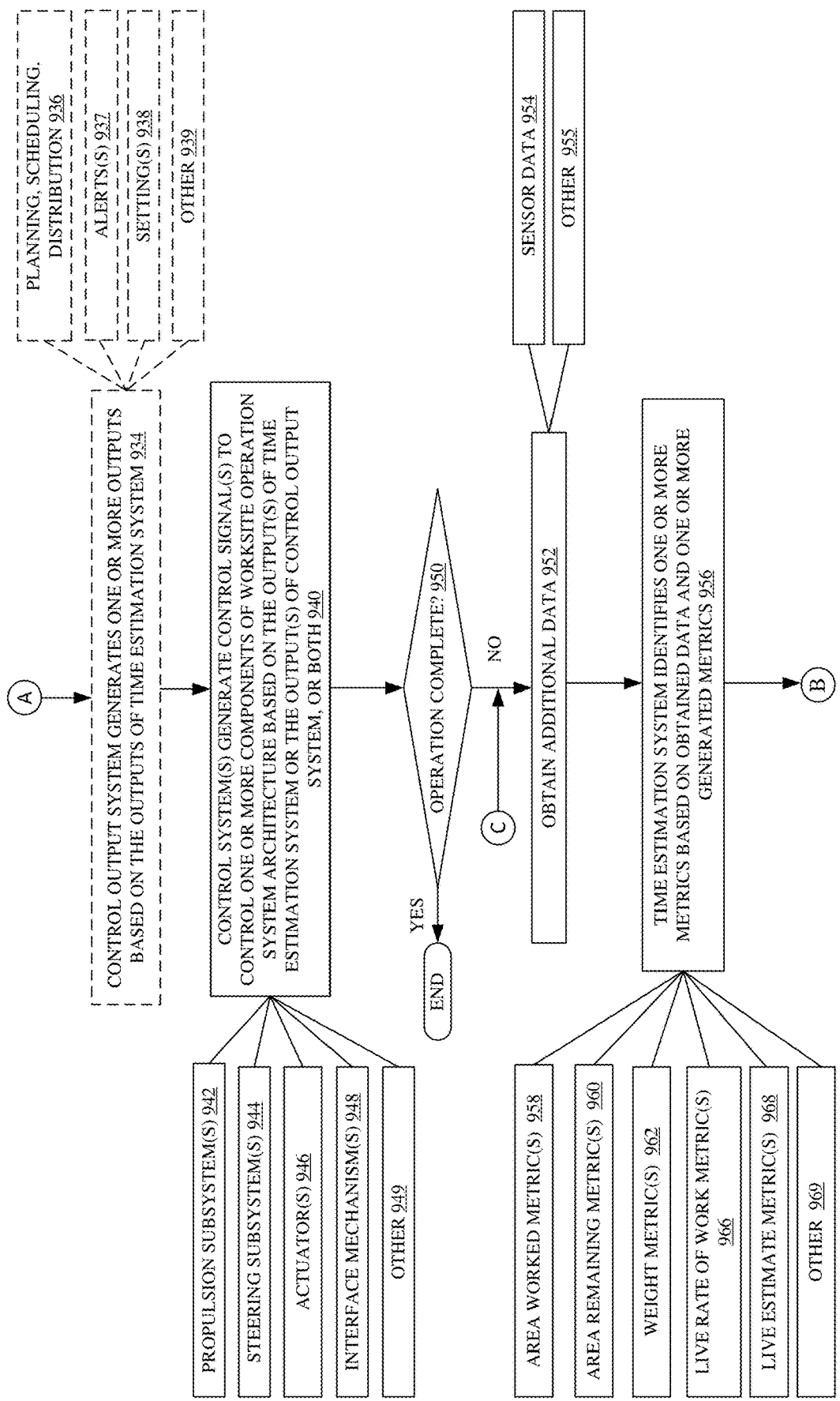
Figure 7C:
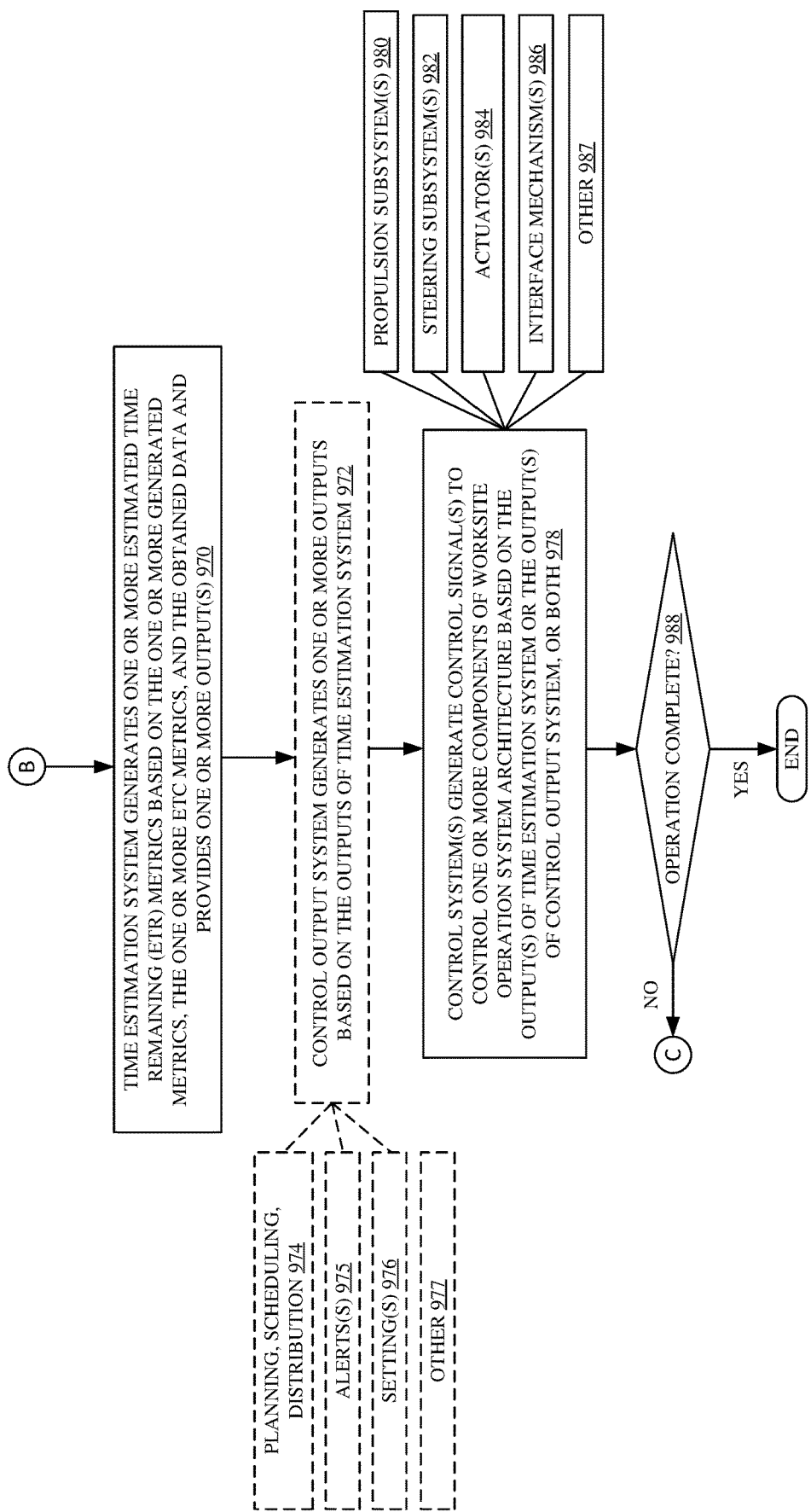

FIGS. 7A-7C (collectively referred to herein as FIG. 7) is a flow diagram showing one example operation 900 of a worksite operation system architecture in generating an estimated time to complete (ETC) and an estimated time remaining (ETR).

It is first assumed at block 902 that an operation is not yet underway. At block 902 various data is obtained (e.g., received, retrieved, generated, etc.). For example, the obtained data can include worksite data 502 as indicated by block 904. The obtained data can include sensor data 504 as indicated by block 906. The obtained data can include machine data 506 as indicated by block 908. The obtained data can include historical data 508 as indicated by block 910. The obtained data can include one or more models 509 as indicated by block 912. The obtained data can include various other data (e.g., 510, etc.) as indicated by block 913.

At block 914, time estimation system 310 generates one or more metrics based on the data obtained at block 902. For example, active area logic 322 can generate one or more active area metrics 602 as indicated by block 916. Active duration logic 324 can generate one or more active duration metrics 604 as indicated by block 918. Width logic 320 can generate one or more width metrics 600 as indicated by block 920. Historical rate of work logic 328 can generate one or more historical rate of work metrics 606 as indicated by block 922. As explained in FIG. 4, each historical rate work metric 606 can be based on a corresponding active area metric 602, a corresponding active duration metric 604, and a corresponding width metric 600.

Field area logic 326 can generate one or more field area metrics 608 as indicated by block 924. Base ETC logic 332 can generate one or more base ETC metrics 610 as indicated by block 926. As explained in FIG. 4, each base ETC metric 610 can be based on a corresponding field area metric 608, a corresponding width metric 600, and a corresponding historical rate of work metric 606.

Crop type logic 334 can generate one or more crop type metrics 612 as indicated by block 928. Number of machines logic 336 can generate one or more number of machines metrics 614 as indicated by block 930. Various other metrics can also be generated as indicated by block 931.

At block 932, time estimation system 310 generates one or more ETC metrics 616 based on the metrics generated at block 914 and the data obtained at block 932. Specifically, ETC logic 338 generates one or more ETC metrics 616. As explained in FIG. 4, each ETC metric 616 can be based on a corresponding field area metric 608, a corresponding crop type metric 612, a corresponding number of machines metric 614, a corresponding base ETC metric 610, and a model 509. Time estimation 310 provides, as outputs 350, the one or more ETC metrics 616. Additionally, time estimation system 310 can provide one or more of the other metrics generated at block 914 as outputs 350 as well.

Optionally, at block 934, control output system 312 can generate one or more outputs 355 based on the outputs 350 (e.g., ETC metrics 616, etc.) of time estimation system 310. For example, planning, scheduling, and distribution logic 352 can generate, as outputs 355, one or more planning, scheduling, forecasting, and distribution outputs as indicated by block 936. Alert logic 354 can generate, as outputs 355, one or more alerts as indicated by block 937. Settings logic 358 can generate, as outputs 355, one or more settings outputs as indicated by block 938. Control output system 312 can generate various other outputs as indicated by block 939.

At block 940 a respective control system 414 of each of one or more mobile machines 100 generates one or more control signals to control one or more components of worksite operation system architecture 300 based on the outputs 350 (e.g., ETC metrics 616, etc.), or, where optional block 934 is executed, based on the outputs 355, or both. For example, as indicated by block 942, each of one or more control systems 414 can generate one or more control signals to control a propulsion subsystem 450 to control a travel speed of a mobile machine 100. As indicated by block 944, each of one or more control systems 414 can generate one or more control signals to control a steering subsystem 452 to control a heading (or route) of a mobile machine 100. As indicated by block 946, each of one or more control systems 414 can generate one or more control signals to control one or more actuators 454 to control various operation characteristics of a mobile machine 100. As indicated by block 948, each of one or more control systems 414 can generate one or more control signals to control one or more interface mechanisms (e.g., 318 or 364, or both) to generate indications, such as displays (e.g., 700), or other indications. As indicated by block 949, each of one or more control systems 414 can generate one or more control signals to control various other components of worksite operation system architecture 300, including, but not limited to various other controllable subsystems 456.

At block 950 it is determined if the operation 900 has been completed. For example, it may be determined if any of the worksite operations are now underway. If, at block 950, it is determined that that operation 900 has been completed (e.g., no worksite operations are underway) then processing ends. If, at block 950, it is determined that the operation 900 has not been completed (e.g., at least one of the worksite operations is underway) then processing proceeds at block 952.

At block 952 additional data is obtained (e.g., received, retrieved, generated, etc.). For example, now that at least one worksite operation is underway, sensors 408 on each mobile machine 100 can be generating additional sensor data 504 which can be obtained, as indicated by block 954. Various other data might be updated or additionally generated, since the time the data at block 902 was obtained, and can be obtained, as indicated by block 955. For instance, additional or updated worksite data 502 may be obtained, additional or updated machine data 506 may be obtained, additional or updated historical data 508 may be obtained, additional or updated models 509 may be obtained, and various other additional or updated data (e.g., additional or updated data 510) may be obtained.

At block 956, time estimation system 310 generates one or more metrics based on the data obtained at blocks 902 and 952 and one or more metrics generated at block 914. For example, area worked logic 338 can generate one or more area worked metrics 618 as indicated by block 958. Area remaining logic 336 can generate one or more area remaining metrics 620 as indicated by block 960. Weight logic 340 can generate one or more weight metrics 622 and one or more weight metrics 624 as indicated by block 962. As explained in FIG. 4, each weight metric 622 can be based on a corresponding area remaining metric 620 and a corresponding field area metric 608. As explained in FIG. 4, each weight metric 624 can be based on a corresponding area worked metric 618 and a corresponding field area metric 608.

Live rate of work logic 342 can generate one or more live rate of work metrics 624 as indicated by block 966. Live estimate logic 344 can generate one or more live estimate metrics 628. As explained in FIG. 4, each live estimate metric 628 can be based on a corresponding area remaining metric 620 and a corresponding live rate of work metric 624.

At block 970, time estimation system 310 generates one or more ETR metrics 630 based on the metrics generated at blocks 914 and 956, the data obtained at blocks 902 and 952, and the one or more ETC metrics 916 generated at block 932. Specifically, ETR logic 346 generates one or more ETR metrics 630. As explained in FIG. 4, each ETR metric 630 can be based on a corresponding ETC metric 616, a corresponding weight metric 622, a corresponding live estimate metric 628, and a corresponding weight metric 624. Time estimation system 310 provides, as outputs 350, the one or more ETR metrics 630. Additionally, time estimation system 310 can provide one or more of the other metrics generated at block 956 as outputs 350 as well.

Optionally, at block 972, control output system 312 can generate one or more outputs 355 based on the outputs 350 (e.g., ETR metrics 630, etc.) of time estimation system 310. For example, planning, scheduling, and distribution logic 352 can generate, as outputs 355, one or more planning, scheduling, and distribution outputs as indicated by block 974. Alert logic 354 can generate, as outputs 355, one or more alerts as indicated by block 975. Settings logic 358 can generate, as outputs 355, one or more settings outputs as indicated by block 976. Control output system 312 can generate various other outputs as indicated by block 977.

At block 978 a respective control system 414 of each of one or more mobile machines 100 generates one or more control signals to control one or more components of worksite operation system architecture 300 based on the outputs 350 (e.g., ETR metrics 630, etc.), or, where optional block 972 is executed, based on the outputs 355, or both. For example, as indicated by block 980, each of one or more control systems 414 can generate one or more control signals to control a propulsion subsystem 450 to control a travel speed of a mobile machine 100. As indicated by block 982, each of one or more control systems 414 can generate one or more control signals to control a steering subsystem 452 to control a heading (or route) of a mobile machine 100. As indicated by block 984, each of one or more control systems 414 can generate one or more control signals to control one or more actuators 454 to control various operation characteristics of a mobile machine 100. As indicated by block 986, each of one or more control systems 414 can generate one or more control signals to control one or more interface mechanisms (e.g., 318 or 364, or both) to generate indication, such as displays (e.g., 800), or other indications. As indicated by block 987, each of one or more control systems 414 can generate one or more control signals to control various other components of worksite operation system architecture 300, including, but not limited to various other controllable subsystems 456.

At block 988 it is determined if the operation 900 has been completed. For example, it may be determined if any of the worksite operations are complete or if some other worksite operations have been initiated. If, at block 988, it is determined that the operation 900 has not been completed (e.g., worksite operations are not yet complete or some other worksite operations have been initiated, or both) then processing returns to block 952. If, at block 988, it is determined that that operation 900 has been completed (e.g., worksite operations have been completed and not other worksite operations have been initiated) then processing ends.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures.

Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, controllers, components and/or logic. It will be appreciated that such systems, controllers, components and/or logic can be comprised of hardware items (such as processors and associated memory, or other processing components, some of which are described below) that perform the functions associated with those systems, controllers, components and/or logic. In addition, the systems, controllers, components and/or logic can be comprised of software that is loaded into a memory and is subsequently executed by a processor or server, or other computing component, as described below. The systems, controllers, components and/or logic can also be comprised of different combinations of hardware, software, firmware, etc., some examples of which are described below. These are only some examples of different structures that can be used to form the systems, controllers, components and/or logic described above. Other structures can be used as well.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, controllers, components, logic, and interactions. It will be appreciated that any or all of such systems, components, generators, and interactions may be implemented by hardware items, such as one or more processors, one or more processors executing computer executable instructions stored in memory, memory, or other processing components, some of which are described below, that perform the functions associated with those systems, components, generators, or interactions. In addition, any or all of the systems, controllers, components, logic, and interactions may be implemented by software that is loaded into a memory and is subsequently executed by one or more processors or one or more servers or other computing component(s), as described below. Any or all of the systems, controllers, components, logic, and interactions may also be implemented by different combinations of hardware, software, firmware, etc., some examples of which are described below. These are some examples of different structures that may be used to implement any or all of the systems, components, generators, and interactions described above. Other structures may be used as well.

Figure 8:
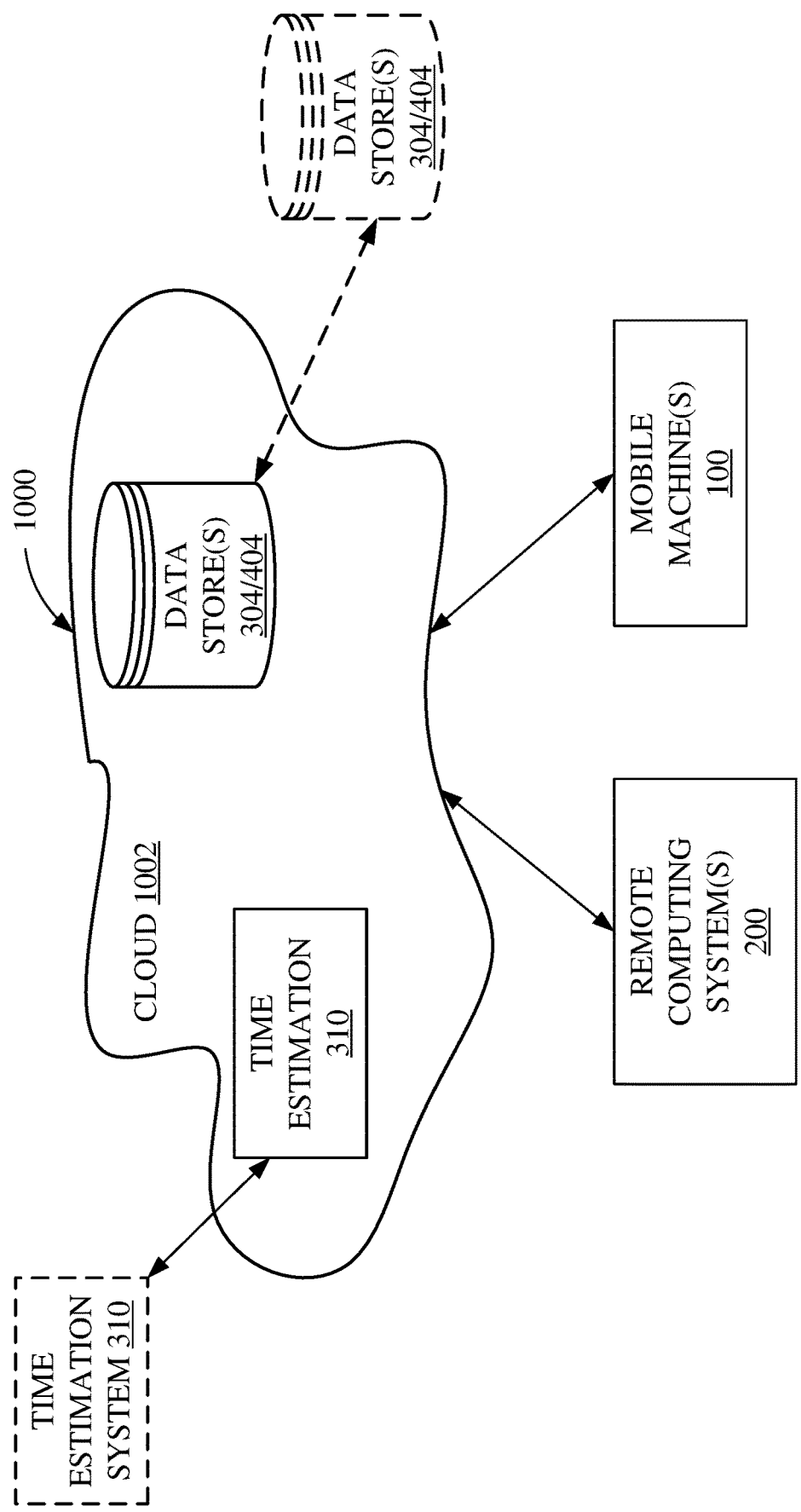
FIG. 8 is a block diagram showing one example of items of a worksite operations system architecture in communication with a remote server architecture.

FIG. 8 is a block diagram of a remote server architecture 1000. FIG. 8, also shows one or more mobile machines 100 and one or more remote computing systems 200 in communication with the remote server environment. The mobile machines 100 and remote computing systems 200 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

Figure 9:
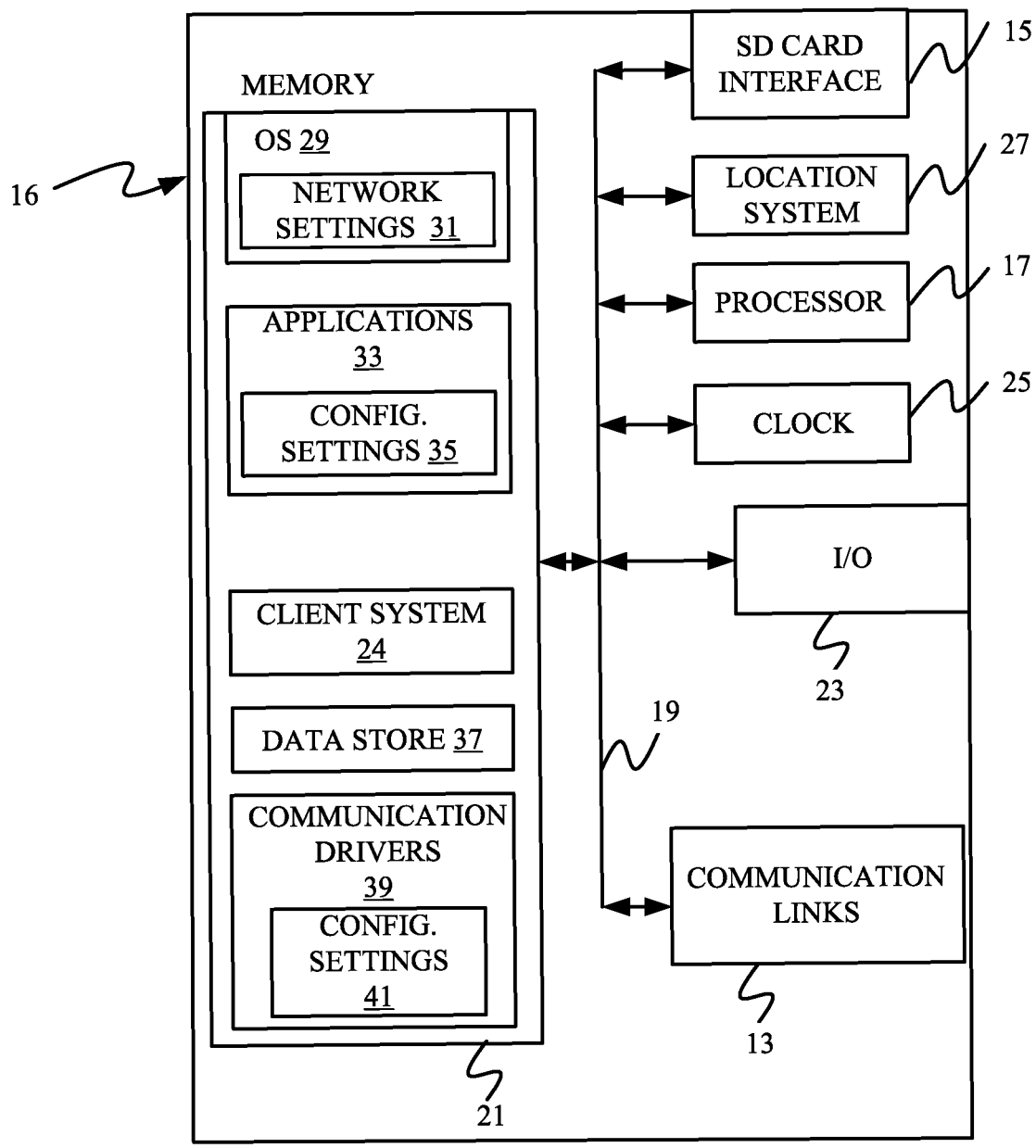
FIGS. 9-11 show examples of mobile devices that can be used in a worksite operation system architecture.

In the example shown in FIG. 8, some items are similar to those shown in previous figures and those items are similarly numbered. FIG. 9 specifically shows that time estimation system 310, data stores 304, or data stores 404, or a combination thereof, may be located at a server location 1002 that is remote from the mobile machines 100 and the remote computing systems 200. Therefore, in the example shown in FIG. 8, mobile machines 100 and remote computing systems 200 accesses systems through remote server location 1002. In other examples, various other items may also be located at server location 1002, such as various other items of worksite operation system architecture 300, such as, but not limited to, control output system 312.

FIG. 8 also depicts another example of a remote server architecture. FIG. 8 shows that some elements of previous figures may be disposed at a remote server location 1002 while others may be located elsewhere. By way of example, one or more of data store(s) 304 and 404 may be disposed at a location separate from location 1002 and accessed via the remote server at location 1002. Similarly, time estimation system 310 may be disposed at a location separate from locations 1002 and accessed via the remote server at locations 1002. Regardless of where the elements are located, the elements can be accessed directly by mobile machines 100 and remote computing systems 200 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine 100 comes close to the machine containing the information collection system, such as a fuel truck prior to fueling, the information collection system collects the information from the mobile machine 100 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine 100 until the mobile machine 100 enters an area having wireless communication coverage. The mobile machine 100, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 10:
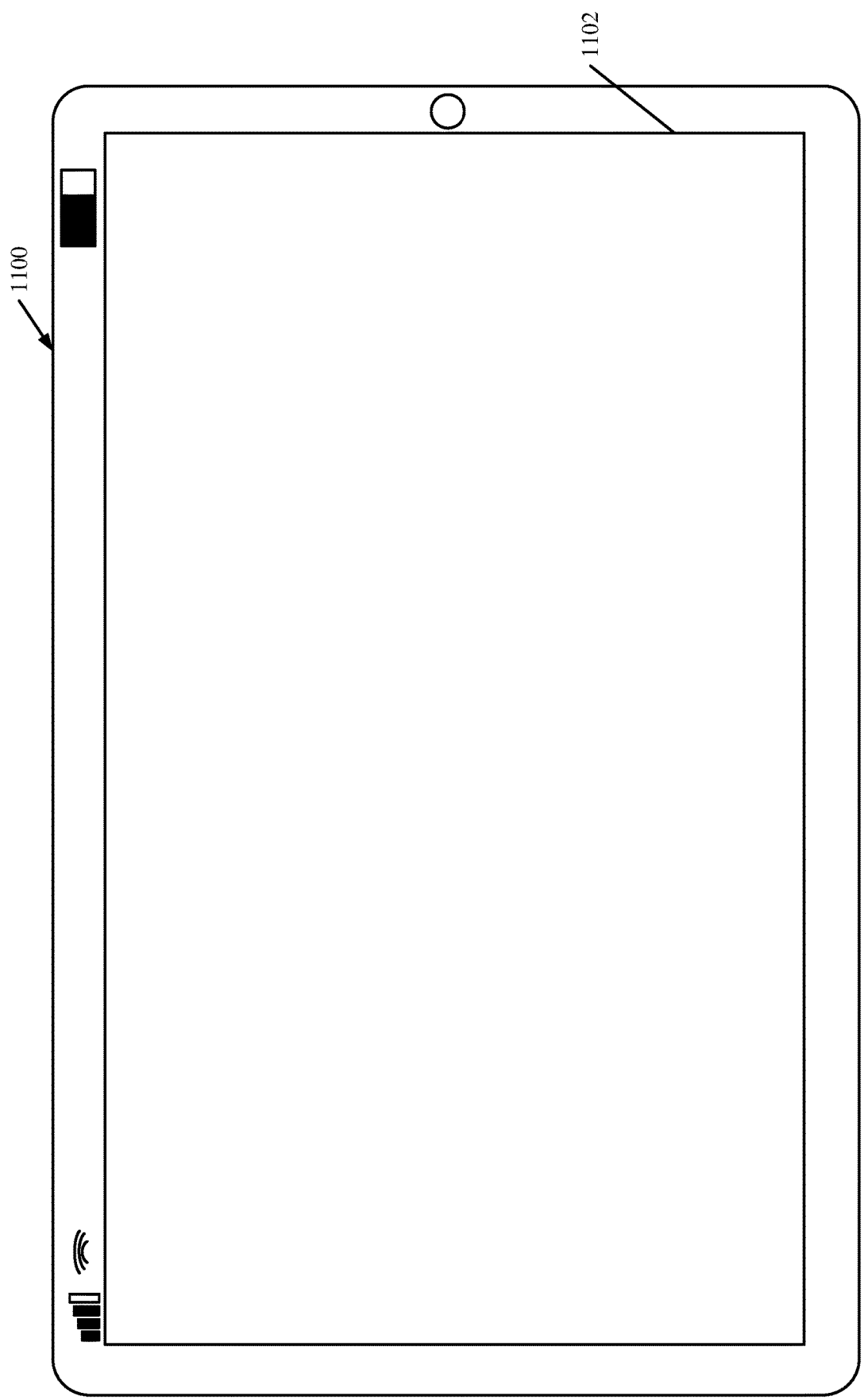
Figure 11:
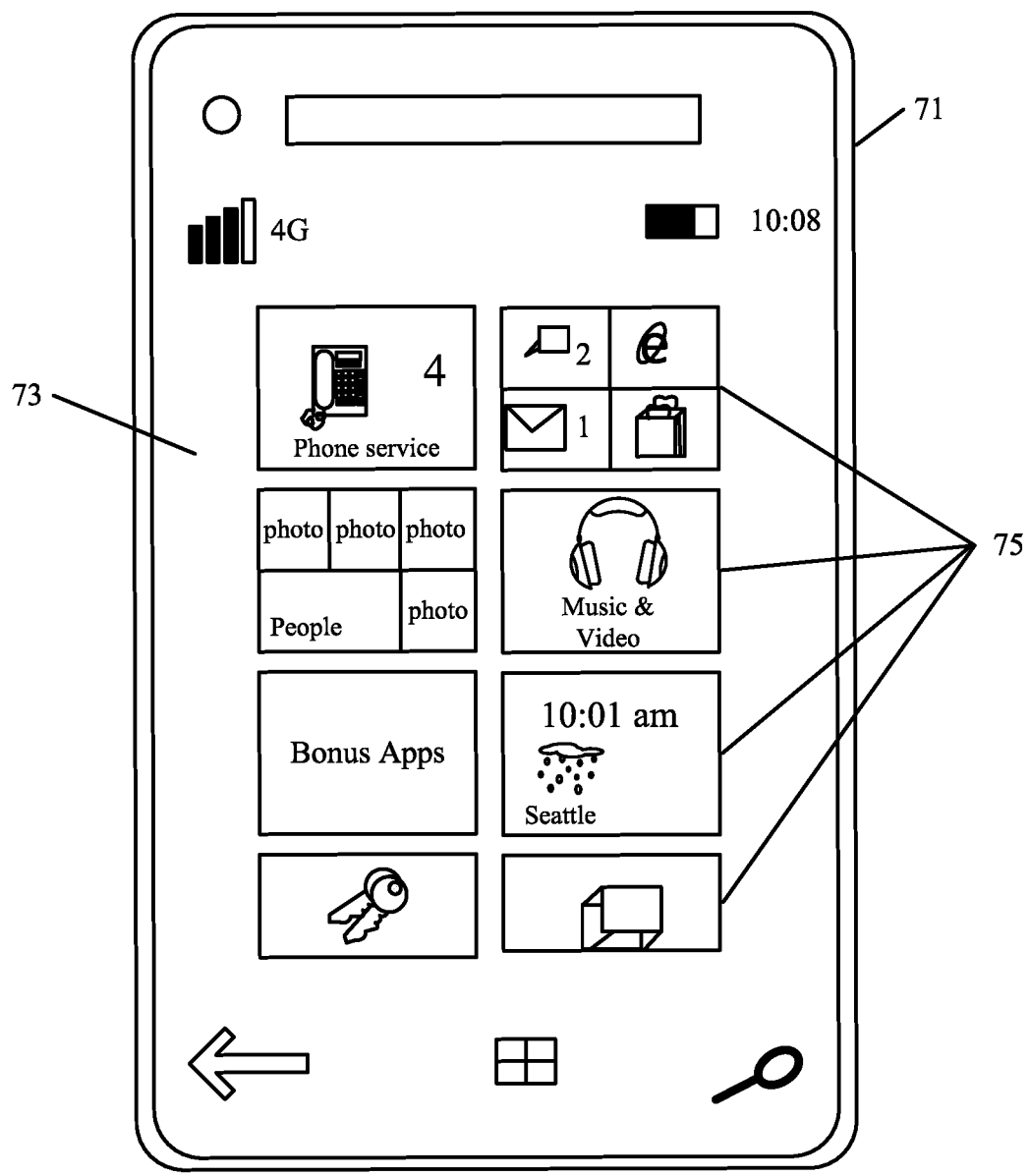

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine 100 for use in generating, processing, or displaying the outputs (e.g., 350 or 355, or both) discussed above. FIGS. 10-11 are examples of handheld or mobile devices.

FIG. 9 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 10 shows one example in which device 16 is a tablet computer 1100. In FIG. 10, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 11 is similar to FIG. 10 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
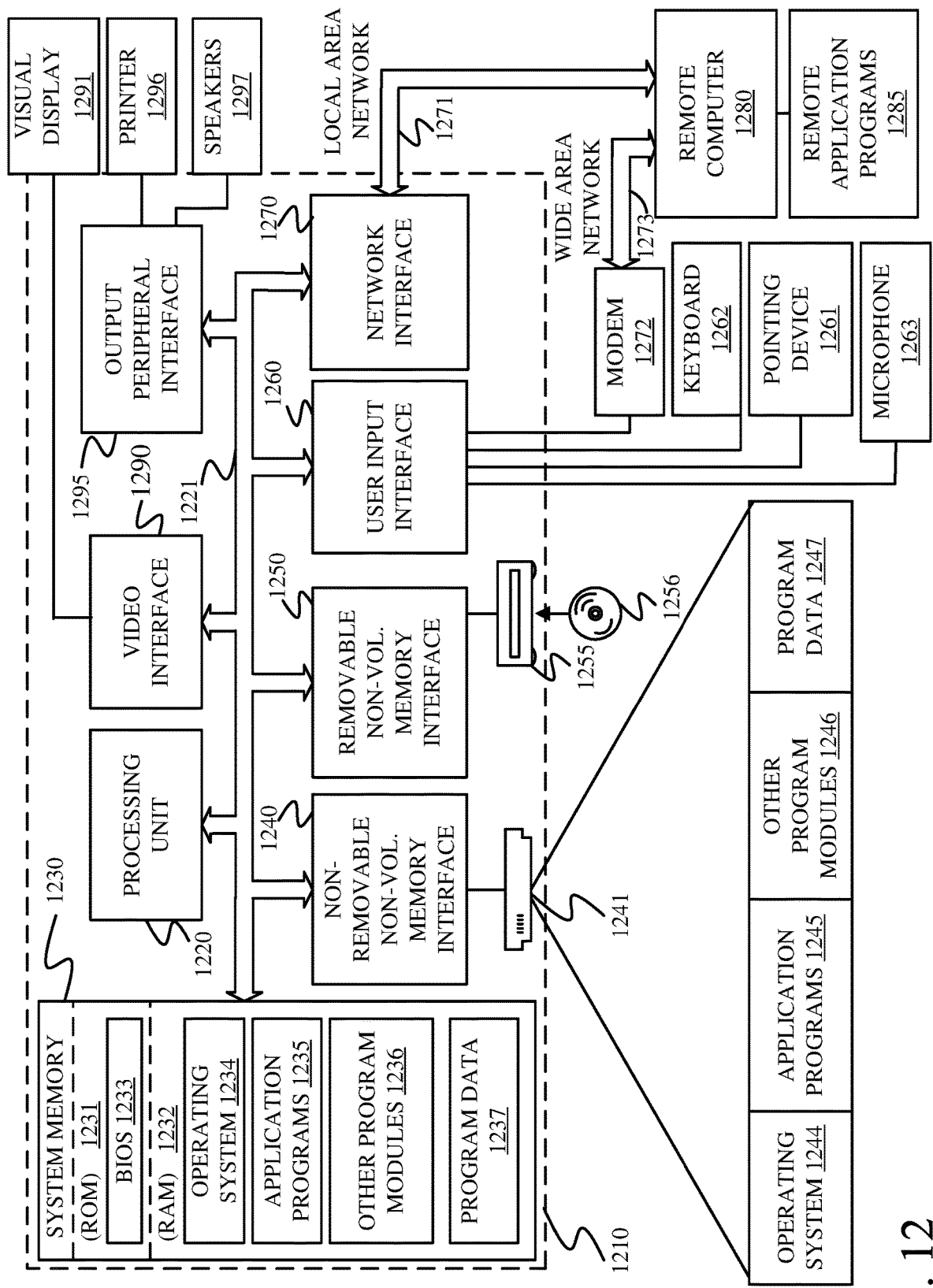
FIG. 12 is a block diagram showing one example of a computing environment that can be used in a worksite operation system architecture.

FIG. 12 is one example of a computing environment in which elements of previous figures described herein can be deployed. With reference to FIG. 12, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 12.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, an optical disk drive 1255, and non-volatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 12 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A worksite operation system comprising:
    one or more processors; and
    memory storing instructions executable by the one or more processors that, when executed by the one or more processors, configure the one or more processors to:
        identify an area of a worksite at which an operation is to be performed; and
        identify, prior to the operation, an estimated time to complete (ETC) metric indicative of a time it will take to complete the operation based on the area of the worksite at which the operation is to be performed;
        identify, during the operation, a first weight metric;
        identify, during the operation, a second weight metric;
        identify, during the operation, a live estimate metric indicative of a first time until a mobile work machine will be completed in the operation;
        identify, during the operation, an estimated time remaining (ETR) metric, indicative of a second time until the work will be completed in the operation, based on the first weight metric, the ETC metric, the second weight metric, and the live estimate metric; and
        control one or more controllable subsystems of the mobile work machine based on the ETR metric.

2. The worksite operation system of claim 1, wherein the one or more controllable subsystems of the mobile work machine comprise one or more of:
    a propulsion subsystem;
    a steering subsystem; and
    an actuator.

3. The worksite operation system of claim 1, wherein the instructions, when executed by the one or more processors, further configure the one or more processors to:
    control an interface mechanism to display the ETC metric.

4. The worksite operation system of claim 1, wherein the instructions, when executed by the one or more processors, further configure the one or more processors to:
    compare the ETC metric to the ETR metric;
    identify deviation between the ETC metric and the ETR metric based on the comparison;
    determine that the deviation meets a deviation threshold; and
    generate an alert based on the determination that the deviation meets a deviation, threshold.

5. The worksite operation system of claim 1, wherein the instructions, when executed by the one or more processors, further configure the one or more processors to identify the ETR metric by applying the first weight metric to the ETC metric and by applying the second weight metric to the live estimate metric.

6. The worksite operation system of claim 1, wherein the instructions, when executed by the one or more processors, further configure the one or more processors to:
    obtain a machine learned model; and
    identify, prior to the operation, the ETC metric indicative of the time it will take to complete the operation based on the area of the worksite at which the operation is to be performed and the machine learned model.

7. The worksite operation system of claim 1, wherein the instructions, when executed by the one or more processors, further configure the one or more processors to:
    identify a historical rate of work metric, indicative of a historical rate at which work is completed;
    obtain a model;
    identify a number of work machines that are to perform the operation;
    identify a crop type corresponding to the operation to be performed; and
    identify the ETC metric indicative of the time to complete the operation based on the area of the worksite at which the operation is to be performed, the historical rate of work metric, the number of work machines that are to perform the operation, the crop type corresponding to the operation, and the model.

8. A computer implemented method comprising:
    identifying an area of a worksite at which an operation is to be performed;
    identifying a historical rate of work metric, indicative of a historical rate at which work is completed;
    identifying a base estimated time to complete (ETC) metric based on the area of the worksite and the historical rate of work metric;
    obtaining a model;
    identifying a number of work machines that are to perform the operation;
    identifying a crop type corresponding to the operation to be performed;
    identifying an ETC metric indicative of a time it will take to complete the operation based on the area of the worksite at which the operation is to be performed, the historical rate of work metric, the number of work machines that are to perform the operation, the crop type corresponding to the operation, the base ETC metric, and the model; and
    controlling one or more controllable subsystems of a work machine, of the number of work machines, based on the ETC metric.

9. The computer implemented method of claim 8, wherein controlling the one or more controllable subsystems of the work machine, of the number of work machines, comprises one or more of:
    controlling a propulsion subsystem of the work machine;
    controlling a steering subsystem of the work machine; and
    controlling an actuator of the work machine.

10. The computer implemented method of claim 8, and further comprising:
    controlling an interface mechanism to display the ETC metric.

11. The computer implemented method of claim 8 and further comprising:
    identifying, once the operation has been initiated, a first weight metric;
    identifying, once the operation has been initiated, a second weight metric;
    identifying, once the operation has been initiated, a live estimate metric indicative of a first time until the work will be completed in the operation;
    identifying an estimated time remaining (ETR) metric, indicative of a second time until the work will be completed in the operation, based on the first weight metric, the ETC metric, the second weight metric, and the live estimate metric; and
    controlling one or more controllable subsystems of the work machine, of the number of work machines, based on the ETR metric.

12. The computer implemented method of claim 11, and further comprising:
controlling one or more controllable subsystems of an additional work machine, of the number of work machines, based on the ETR metric.

13. The computer implemented method of claim 11, and further comprising:
controlling an interface mechanism to display the ETR metric.

14. A worksite operation system comprising:
one or more processors; and
memory storing executable by the one or more processors that, when executed by the one or more processors, configure the one or more processors to:
- identify for each historical operation, of a plurality of historical operations, a respective historical active area metric, indicative of an active area of a worksite at which the corresponding historical operation was performed, a respective historical operating width metric, corresponding to an operating width of a respective mobile work machine that performed the corresponding historical operation, and a respective historical active duration metric, indicative of an amount of time that the respective mobile work machine that performed the corresponding historical operation was actively performing the corresponding historical operation;
- identify a historical rate of work metric, indicative of a rate at which work is historically completed, based on the respective historical active area metric, the respective historical operating width metric, and the respective historical active duration for each historical operation of the plurality of historical operations;
- identify a worksite area metric indicative of an area of a worksite at which an operation is to be performed;
- identify a width metric corresponding to a width of a mobile agricultural machine that is to perform the operation at the worksite;
- identify a base estimated time to complete (ETC) metric based on the worksite area metric, the width metric, and the historical rate of work metric;
- obtain a machine learned model;
- identify a number of machines metric indicative of a number of machines that are to perform the operation at the worksite;
- identify a crop type metric indicative of a type of crop corresponding to the operation at the worksite;
- identify an ETC metric, indicative of a time it will take to complete the operation at the worksite, based on the base ETC metric, the number of machines metric, the crop type metric, the machine learned model, and the worksite area metric;
- identify, once the operation at the worksite has been initiated, an area remaining metric indicative of an area of the worksite yet to be worked in the operation;
- identify a first weight metric based on the area remaining metric and the worksite area metric;
- identify, once the operation at the worksite has been initiated, an area worked metric indicative of an area of the worksite already worked in the operation;
- identify a second weight metric based on the area worked metric and the worksite area metric;
- identify, once the operation at the worksite has been initiated, a live rate of work metric indicative of rate at which work is being done in the operation;
- identify a live estimate metric, indicative of live estimate of the time until the operation will be completed, based on the area remaining metric and the live rate of work metric;
- identify an estimated time remaining (ETR) metric based on the first weight metric, the ETC metric, the second weight metric, and the live estimate metric; and
- control one or more controllable subsystems of a machine, of the number of machines, based on the ETR metric.

15. The worksite operation system of claim 14, wherein each historical operation, of the plurality historical operations is performed by the same mobile work machine or by a plurality of different mobile work machines of a same organization or wherein each historical operation, of the plurality of historical operations is a same type of operation.

16. The worksite operation system of claim 14, wherein the one or more controllable subsystems of the machine comprise one or more of:
a propulsion subsystem;
a steering subsystem; and
an actuator.

* * * * *